United States Patent [19]
Rich

[11] Patent Number: 5,517,809
[45] Date of Patent: May 21, 1996

[54] CONVERTIBLE LAWN MOWER

[76] Inventor: Tom Rich, 10656 Andrade Dr., Zionsville, Ind. 46077

[21] Appl. No.: 422,229

[22] Filed: Apr. 14, 1995

[51] Int. Cl.⁶ ................................................ A01D 34/64
[52] U.S. Cl. ........................... 56/2; 56/10.8; 56/16.9; 56/DIG. 18
[58] Field of Search ............................ 56/2, 10.8, 11.1, 56/11.2, 11.3, 11.4, 11.5, 11.8, 13.5, 15.7, 15.8, 16.9, 16.7, DIG. 6, DIG. 18; 180/19.3

[56] References Cited

U.S. PATENT DOCUMENTS

| | | | |
|---|---|---|---|
| 4,429,515 | 2/1984 | Davis, Jr. et al. | 56/6 |
| 4,967,543 | 11/1990 | Scag et al. | 56/10.8 |
| 5,239,810 | 8/1993 | Gugel | 56/10.8 |
| 5,247,784 | 9/1993 | Kitamura et al. | 56/10.8 |
| 5,307,612 | 5/1994 | Tomiyama et al. | 56/11.1 |
| 5,337,543 | 8/1994 | Kitamura et al. | 56/10.8 |
| 5,355,661 | 10/1994 | Tomiyama | 56/10.8 |

*Primary Examiner*—Terry Lee Melius
*Attorney, Agent, or Firm*—Locke Reynolds

[57] ABSTRACT

A convertible lawn mower of the zero turning radius type is disclosed for use in a riding mode and a walking mode. A control member attached to a control head is rotatable between a first position where the control head is proximate to a seat and a second position where the control head is disposed generally behind the lawn mower. Control levers attached to concentric rotatable upper tubes are rotationally coupled to concentric rotatable lower tubes by loop means, for control of variable speed reversible transmissions coupled to rear wheels.

33 Claims, 18 Drawing Sheets

5,517,809

CONVERTIBLE LAWN MOWER

BACKGROUND OF THE INVENTION

1. Field of the Invention

The present invention generally relates to lawn mowers, and more particularly concerns lawn mowers of the type that are capable of use in a mode where the operator rides upon the lawn mower and, in addition, in a mode where the operator walks along with the lawn mower.

2. Description of the Prior Art

The array of available lawn mowers includes a wide variety of devices where the operator rides upon the lawn mower, and devices where the operator walks with the mower.

Riding lawn mowers typically have an internal combustion engine mounted to a chassis, and coupled to a grass cutting deck attached below the chassis, with an operator's seat attached upon the chassis. Where the riding mower is of the zero-turning radius type, a pair of caster type front wheels may be supplied along with a pair of rear wheels, each rear wheel attached to a variable speed reversible transmission, such as a hydrostatic transmission, the transmissions coupled to the engine. By separately controlling each of the transmissions, drive to the rear wheels is supplied, providing both propulsion and steering for the lawn mower. Walking lawn mowers typically have an internal combustion engine mounted to a chassis with a grass cutting deck coupled to the engine, and may, in a manner similar to riding mowers, have separately controllable hydrostatic transmissions and rear wheels.

In various circumstances, it is desirable that a lawn mower be capable of operation in both a riding mode and a walking mode. For mowing large, uninterrupted expanses, a riding lawn mower is generally appropriate in order to increase efficiency and reduce operator fatigue. On the other hand, where vertical clearance is limited, for instance near low trees and similar obstacles, operation of a lawn mower in a walking mode is most advantageous.

There are presently available a number of lawn mowers that are described as capable of use in both such modes, that is, the operator may ride upon the lawn mower, or, alternatively, the operator may walk along with the lawn mower. One such device is described in U.S. Pat. No. 5,307,612, where a generally curved L-shaped handle post may be pivoted between a first position where the horizontal portion of the handle post is proximate to a seat, and a second position where the horizontal portion is disposed behind the lawn mower. In both positions, the lawnmower is operated by squeeze-type control levers actuating control wires disposed through the curved handle post. In lawn mowers of this type, while the controls may operate as intended when the curved handle post in disposed in either the walking or riding configuration, after the curved handle post has been rotated for operation in the other mode, the control wires may bind or go out of adjustment. As a result, for instance, when the control levers are apparently disposed in a neutral position, the transmissions of the lawn mower may not actually be in a neutral position, with the result that the lawn mower may move forward or backward contrary to the desire and at the peril of the operator. In addition, after a long period of use, operator fatigue with respect to repeated activation of the control levers may become a significant problem. In another device, described by U.S. Pat. No. 5,355,661, separate control portions are provided for use in the riding mode and in the walking mode, with a control prohibiting device for alternatively preventing operation of one of the control portions. By pivoting through approximately 30 degrees about a transverse axis, a steering handle is moved from a rear position for the walking mode to a front position where an arm attached to the front of the steering handle is used in the riding mode.

Despite the availability of such lawn mowers, there exists a need in the art for a lawn mower that is capable of use in both a riding mode and a walking mode, yet has a relatively simple, robust and easily serviced control system for variable speed reversible transmissions that is capable of reliable use with a minimum of physical effort.

SUMMARY OF THE INVENTION

In order to aid in the understanding of the present invention, it can be stated in essentially summary form that it is directed to a lawn mower that is capable of operation in a mode where the operator rides upon the lawn mower and in a mode where the operator walks along with the lawn mower.

More specifically, the present invention is directed to an improved lawn mower for use in a riding mode and a walking mode, having an internal combustion engine mounted to a chassis, with a grass cutter deck attached below chassis between caster-type front wheels and driven rear wheels, with the blades of the cutter deck coupled to the engine. A operator's seat is attached to chassis above engine and proximate to a fuel tank. The engine is also coupled to a pair of variable speed reversible transmissions, each transmission connected to a transaxle in turn connected to one of the rear wheels. A hinged floor plate may be swung to an open position in order to gain access to the grass cutter deck, and seat hinges facilitate access to the engine.

A control member is formed of an upper shaft and a lower shaft attached to a hollow central connecting portion, with the upper and lower shafts disposed in parallel spaced-apart relation at opposing ends of the connecting portion. A first upper tube is rotatably and collinearly disposed surrounding the upper shaft, and a second upper tube is rotatably and collinearly disposed surrounding the first upper tube, with the first and second upper tubes disposed concentrically with respect to the upper shaft, the first and second upper tubes independently rotatable with respect to the upper shaft. A first lower tube is similarly rotatably and collinearly disposed surrounding lower shaft, and a second lower tube is rotatably and collinearly disposed surrounding the first lower tube. The lower shaft is rotatably attached to the chassis at lower shaft bearings, with rotation of the lower shaft independent of rotation of the first and second lower tubes. The upper and lower shafts are disposed to be generally horizontal, and the connecting portion is disposed to be generally vertical. The control member is rotatable with respect to the chassis between a first position where the upper shaft is proximate to the seat for operation in the riding mode, and a second position where the upper shaft is generally behind the lawn mower for operation in the walking mode.

A first upper sprocket is attached to the first upper tube and a substantially equal radius first lower sprocket is attached to the first lower tube. Similarly, a second upper sprocket is attached to the second upper tube and a substantially equal radius second lower sprocket is attached to the second lower tube. A first chain is disposed around and rotatably connecting the first upper and lower sprockets, and a second chain is disposed around and rotatably connects the second upper and lower sprockets. Consequently, angular rotation of the first upper tube produces a substantially equal angular rotation of the first lower tube, and angular rotation of the second upper tube causes a substantially equal angular rotation of the second lower tube.

A generally planar control head having a pair of slots is rotatably attached to the upper shaft so that rotation of the control head is independent of rotation of the first and second upper tubes. A tie rod is pivotally attached between the control head and the chassis, generally parallel to the connecting portion so that the plane of the control head does not rotate upon movement of the control member with respect to the chassis. First and second control levers are attached to first and second upper tubes, and project through the slots. A tube extension is rotatably disposed around the upper shaft and is coupled to the first upper tube for co-rotative movement by a coupling strap, and an adjustable handle is pivotally attached to the control head and acts to limit movement of the first and second control levers.

A lower clamp is adjustably attached surrounding the first lower tube and an angle arm is attached to the lower clamp, projecting from the axis of the first lower tube. An adjustable link rod is pivotally connected to the angle arm, and is disposed generally normal to the axis of the first lower tube. A beam is attached to the chassis generally parallel to the lower shaft, and a transmission shaft upper and lower bearings are aligned with a transmission shaft bore disposed normally through the beam and in mating alignment with the transmission shaft. The transmission shaft controls one of the transmissions. An upper slotted arm and a lower slotted arm are attached to the transmission shaft above and below the beam. The upper slotted arm is pivotally connected to the link rod so that rotation of the first lower tube causes translation of the link rod, rotation of the upper slotted arm and the lower shaft slotted arm, and rotation of the transmission shaft, controlling one of the transmissions. To positively urge the transmission shaft to a neutral position, a roller is provided at an upper slotted arm distal end for rotative contact with an angled detent arm pivotally attached to the beam by a detent arm pin. An upper spring is attached between the beam and the detent arm, biasing the roller to be disposed at the vertex of the detent arm. Direct biasing of the detent arm to the neutral position is provided by a pair of lower springs, each attached between the lower slotted arm and the beam.

As the first control lever is moved forward towards the handle, the first upper tube and the first upper sprocket rotate, causing the first chain to move, rotating the first lower sprocket, the first lower tube, and the angle arm. As a result, the link rod translates, causing rotation of the upper slotted arm and the lower slotted arm, rotating the transmission shaft so that forward drive is delivered to one of the rear wheels. As the upper slotted arm rotates, the roller rolls from the vertex of the detent arm, away from the detent arm pin. For the reason that the distance between the transmission shaft and the roller is constant, during rotation of the upper slotted arm, the detent arm pivots about the detent arm pin.

As the first control lever is moved away from the handle, the first upper tube and the first upper sprocket oppositely rotate, causing the first chain to move in the opposite direction, oppositely rotating the first lower sprocket, the first lower tube, and the angle arm. The link rod translates oppositely as before, causing opposite rotation of the upper slotted arm and the lower slotted arm, rotating the transmission shaft so that reverse drive is delivered to one of the rear wheels. As the upper slotted arm rotates, the roller rolls from the vertex of the detent arm towards the detent arm pin.

In a similar manner, the second control lever acts to control the movement of another rear wheel.

In use, when the lawn mower is operated in the riding mode, the control member is positioned with the upper shaft proximate to the seat by rotating the connecting portion until contact with a support bar of a front standard, and then inserting an arm pin through standard arm holes of the front standard. Forward movement of the first and second control levers causes the rear wheels to selectively rotate forward, and backward movement causes selective backward rotation. To cause the lawn mower to move forward in a straight line at a predetermined maximum speed, the first and second control levers are each moved forward until contact is made with the handle.

To operate the lawn mower in the walking mode, the control member is rotated backward, with the first and second lower sprockets and the first and second lower tubes remaining stationary, while the first and second upper sprockets rotate with respect to the upper shaft due to movement of the first and second chains wrapping around the first and second lower sprockets. As the first upper sprocket has substantially the same radius as the first lower sprocket, the angle through which the control member is rotated is substantially equivalent to the angle by which the first upper sprocket rotates with respect to the upper shaft. Similarly, the angle through which the control member is rotated is substantially equivalent to the angle by which the second upper sprocket rotates with respect to the upper shaft. Therefore, upon rotation of the control member, the angle of the first and second control levers with respect to the lawn mower remains constant as does the angle of the control head, as the tie rod remains parallel to the control member. In the walking mode, the position of the first and second control levers and the handle relative to the lawn mower and the control head is the same as in the riding mode.

It is an object of the present invention to provide a lawn mower that is capable of operation in a mode where the operator rides upon the lawn mower.

It is another object of the present invention to provide a lawn mower that is capable of operation in a mode where the operator walks along with the lawn mower.

It is another object of the present invention to provide a lawn mower having drive wheels that may be individually controlled by the operator in both the riding mode and the walking mode.

It is another object of the present invention to provide a lawn mower that may be easily and quickly changed between the riding mode and the walking mode.

It is another object of the present invention to provide a lawn mower that is easily operated with a minimum number of controls in both the riding mode and the walking mode.

It as another object of the present invention to provide a lawn mower having controls that may be used by operators of varying size and strength in both the riding mode and the walking mode.

It is another object of the present invention to provide a lawn mower having controls that securely maintain drive transmissions in the neutral mode.

It as another object of the present invention to provide a lawn mower having controls that are compact, lightweight, inexpensive to produce, and of relatively simple construction with a minimum number of components, yet are of sturdy construction and may be easily serviced and repaired.

Further objects and advantages of the present invention will be apparent from a study of the following portion of the specification, the claims, and the attached drawings.

DESCRIPTION OF THE PREFERRED EMBODIMENT

The following portion of the specification, taken in conjunction with the drawings, sets forth the preferred embodiment of the present invention. The embodiment of the invention disclosed herein is the best mode contemplated by the inventor for carrying out his invention in a commercial environment, although it should be understood that various modifications can be accomplished within the parameters of the present invention.

Figure 1:
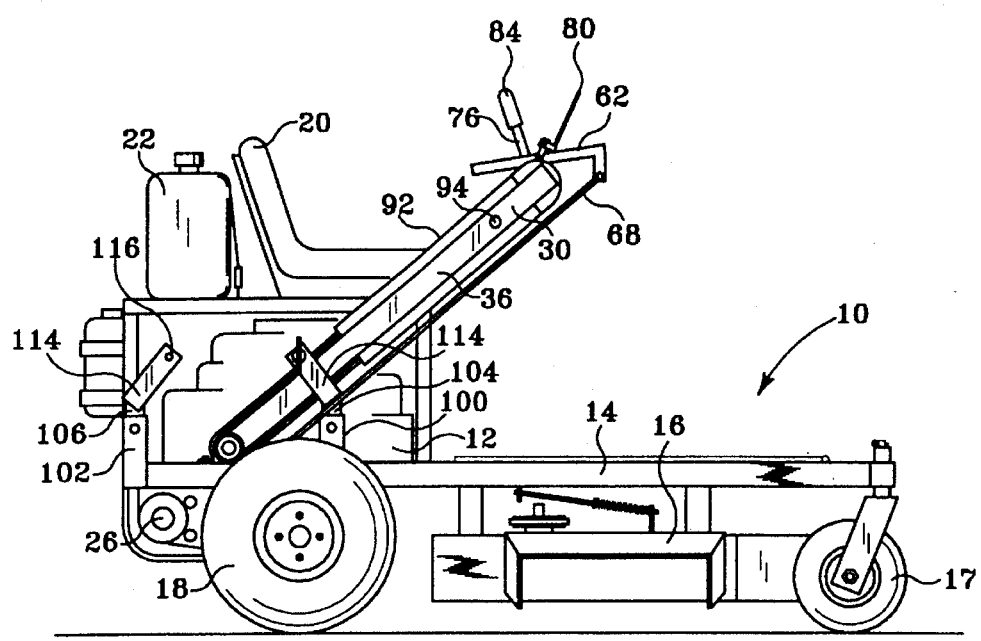
FIG. 1 is a side elevation view of a convertible lawn mower representing the present invention in a mode where the operator rides upon the lawn mower.
Figure 2:
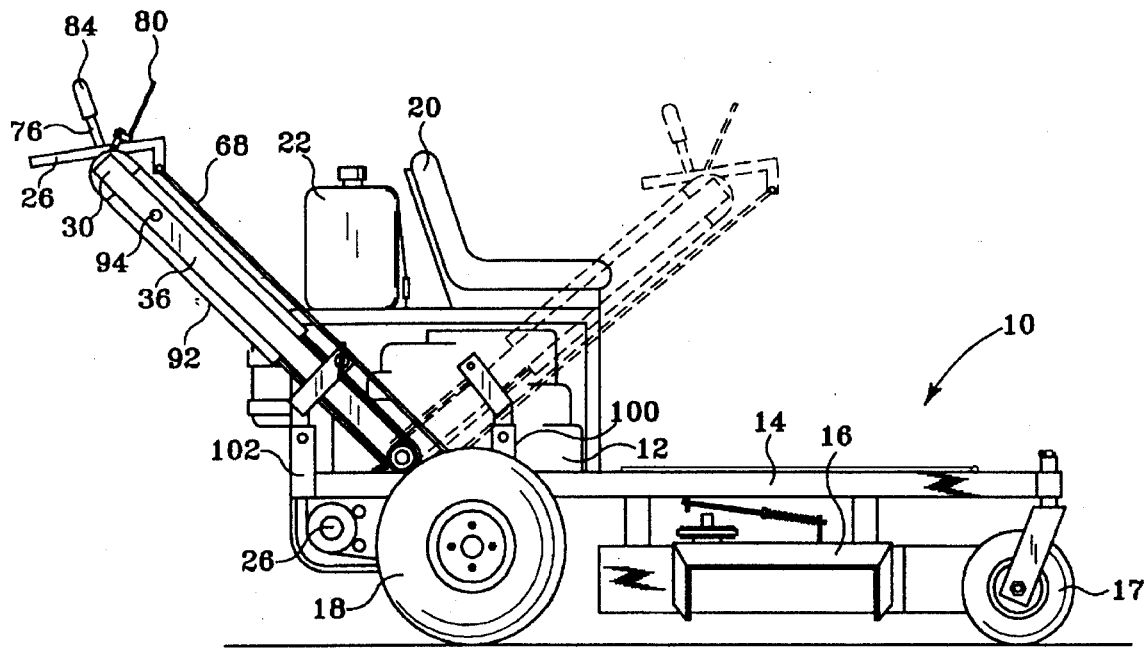
FIG. 2 is a side elevation view of a convertible lawn mower representing the present invention in a mode where the operator walks along with the lawn mower, with the mode where the operator rides upon the lawn mower shown in phantom.
Figure 3:
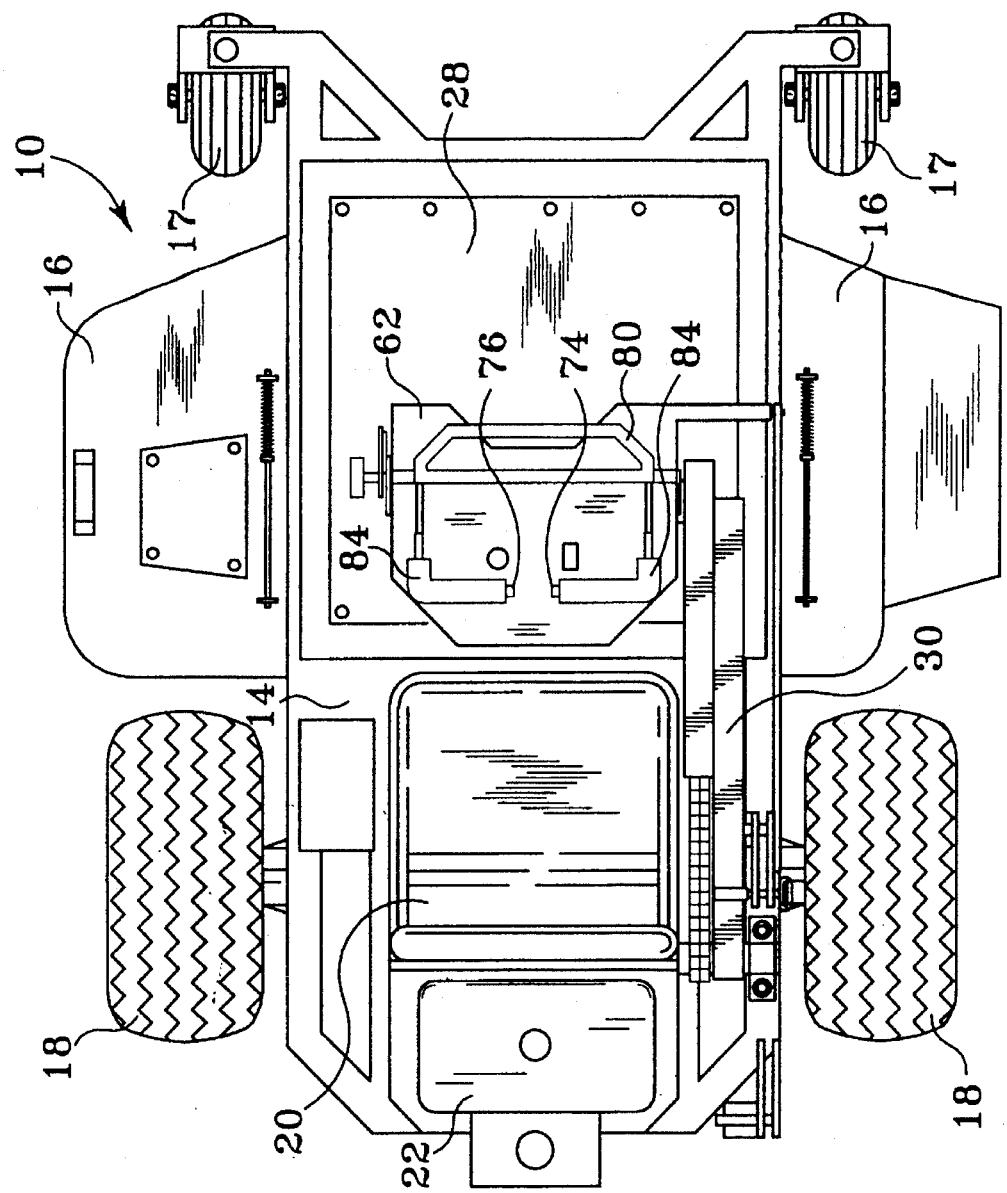
FIG. 3 is plan view a convertible lawn mower representing the present invention in a mode where the operator rides upon the lawn mower.
Figure 4:
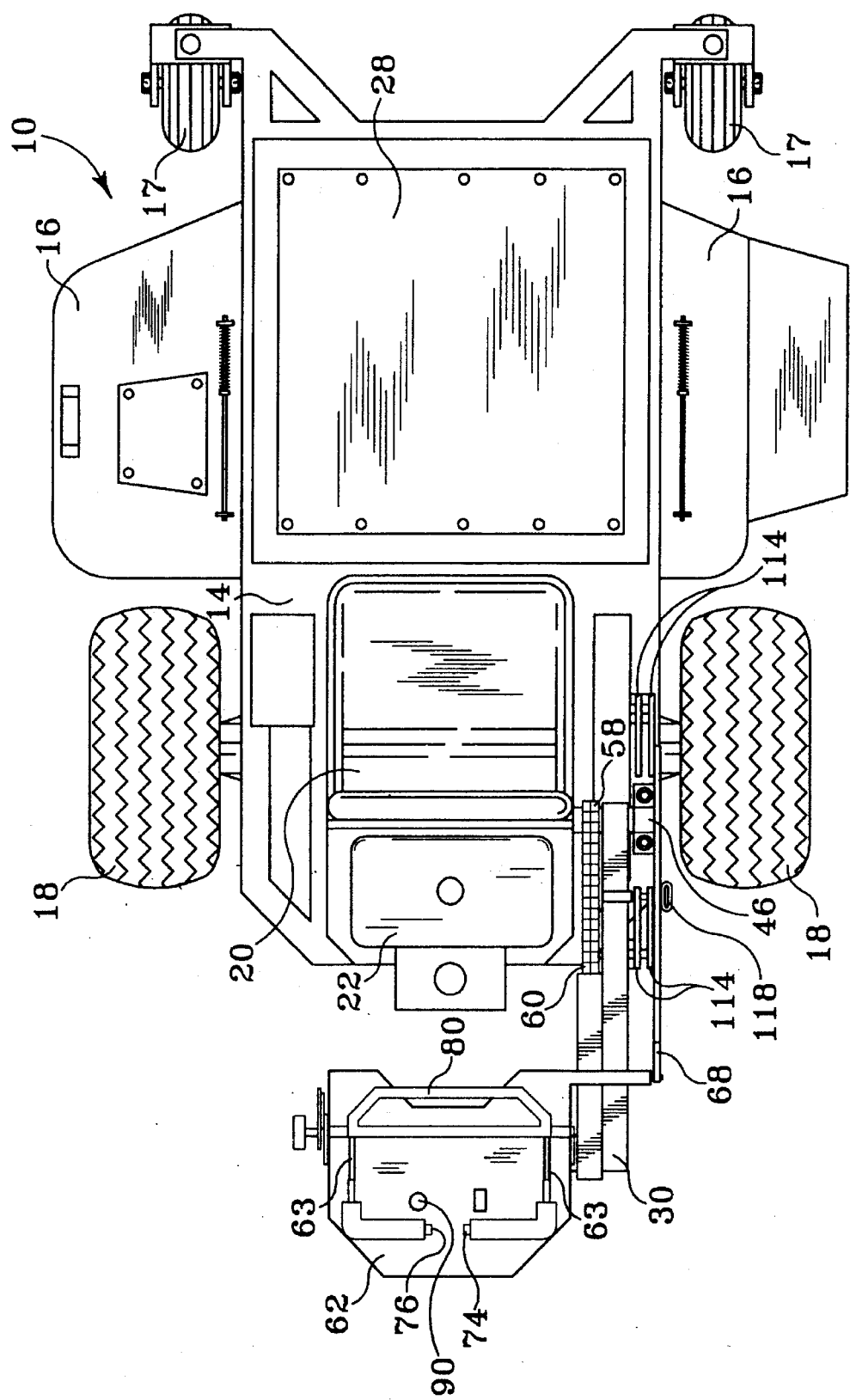
FIG. 4 is a plan view of a convertible lawn mower representing the present invention in a mode where the operator walks along with the lawn mower.
Figure 5:
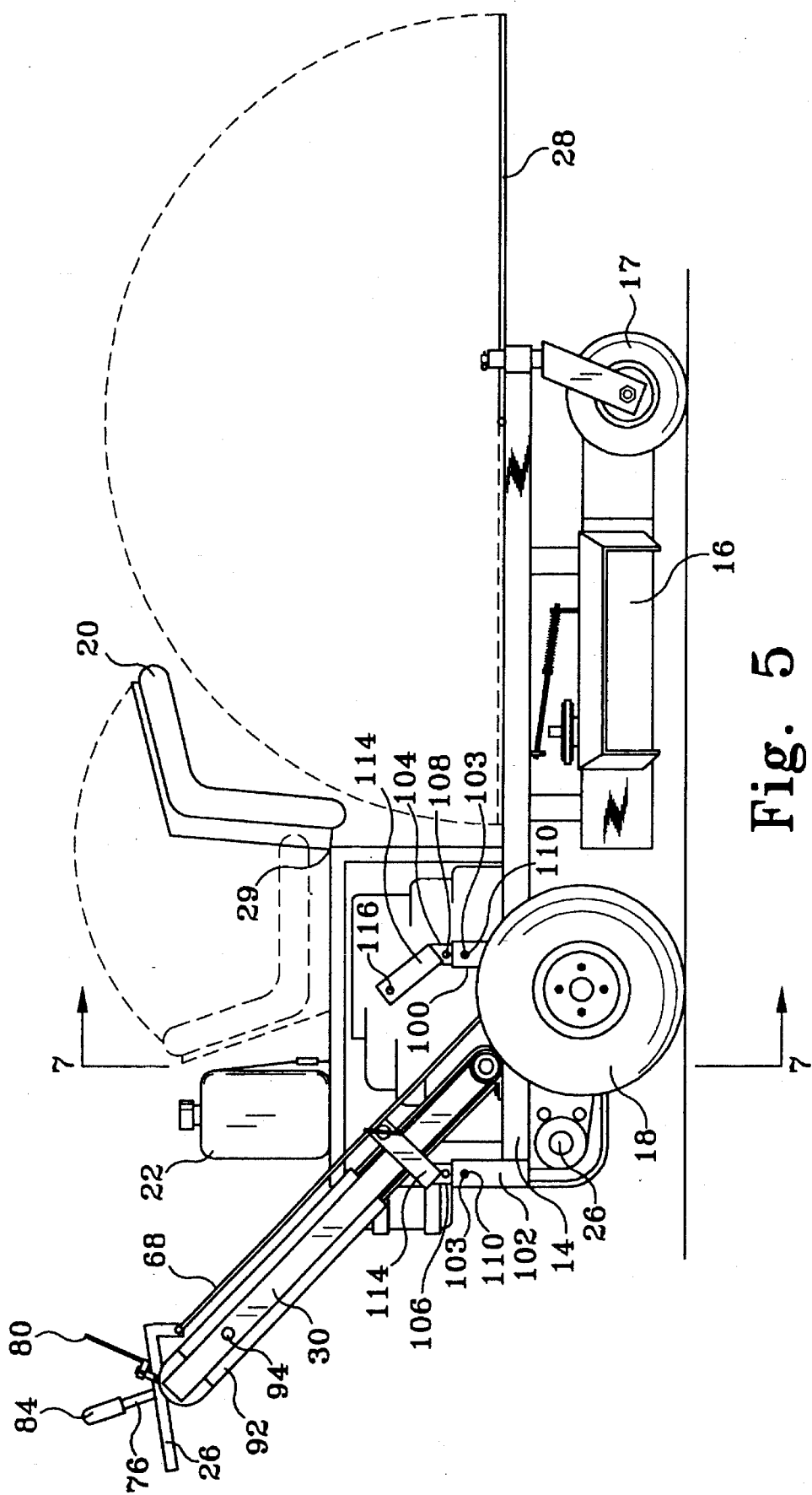
FIG. 5 is a side elevation view of a convertible lawn mower representing the present invention in a mode where the operator walks along with the lawn mower, with the seat and floor plate each shown in an open position, and with the closed position shown in phantom.

Referring now to the drawings for a detailed description of the present invention, reference is first made to FIGS. 1 and 3, generally depicting an improved lawn mower 10 for use in a riding mode, and to FIGS. 2 and 4 for use in a walking mode. Internal combustion engine 12 is mounted to chassis 14, with grass cutter deck 16 attached below chassis 14 between caster-type front wheels 17 and driven rear wheels 18. Seat 20 is attached to chassis 14 above engine 12 and proximate to fuel tank 22. Cutter deck 16 is typically equipped with three vertical axis blades, not shown, although it will be understood that cutter decks may be equipped with more or less than three blades. The blades are coupled to engine 12 in a well-known manner using drive belts and pulleys. As shown in FIG. 5, hinged floor plate 28 may be swung to an open position in order to gain access to grass cutter deck 16. Seat hinges 29 are provided for rotational movement of seat 20 to facilitate access to engine 12.

Figure 6:
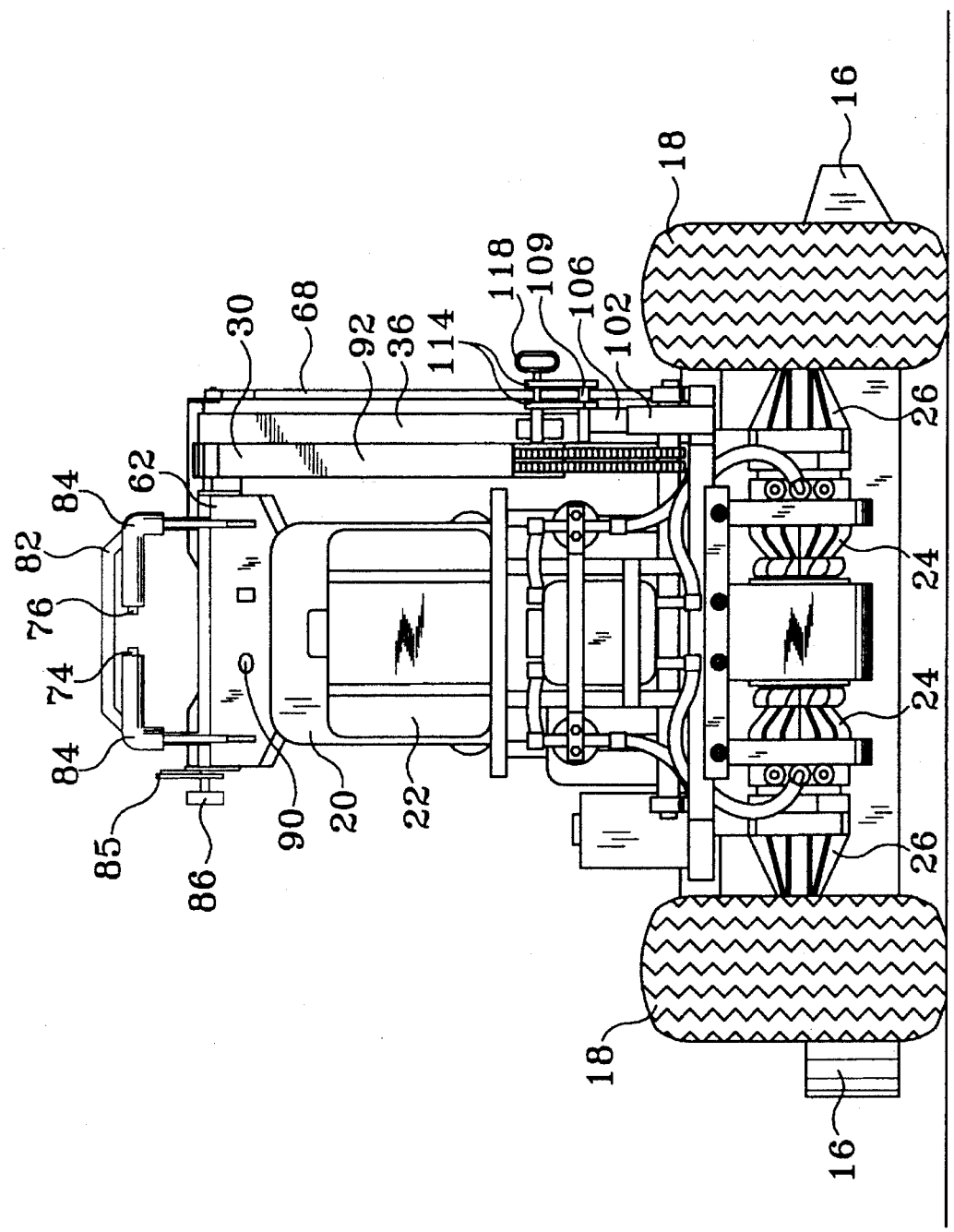
FIG. 6 is a rear view of a convertible lawn mower representing the present invention in a mode where the operator rides upon the lawn mower.
Figure 7:
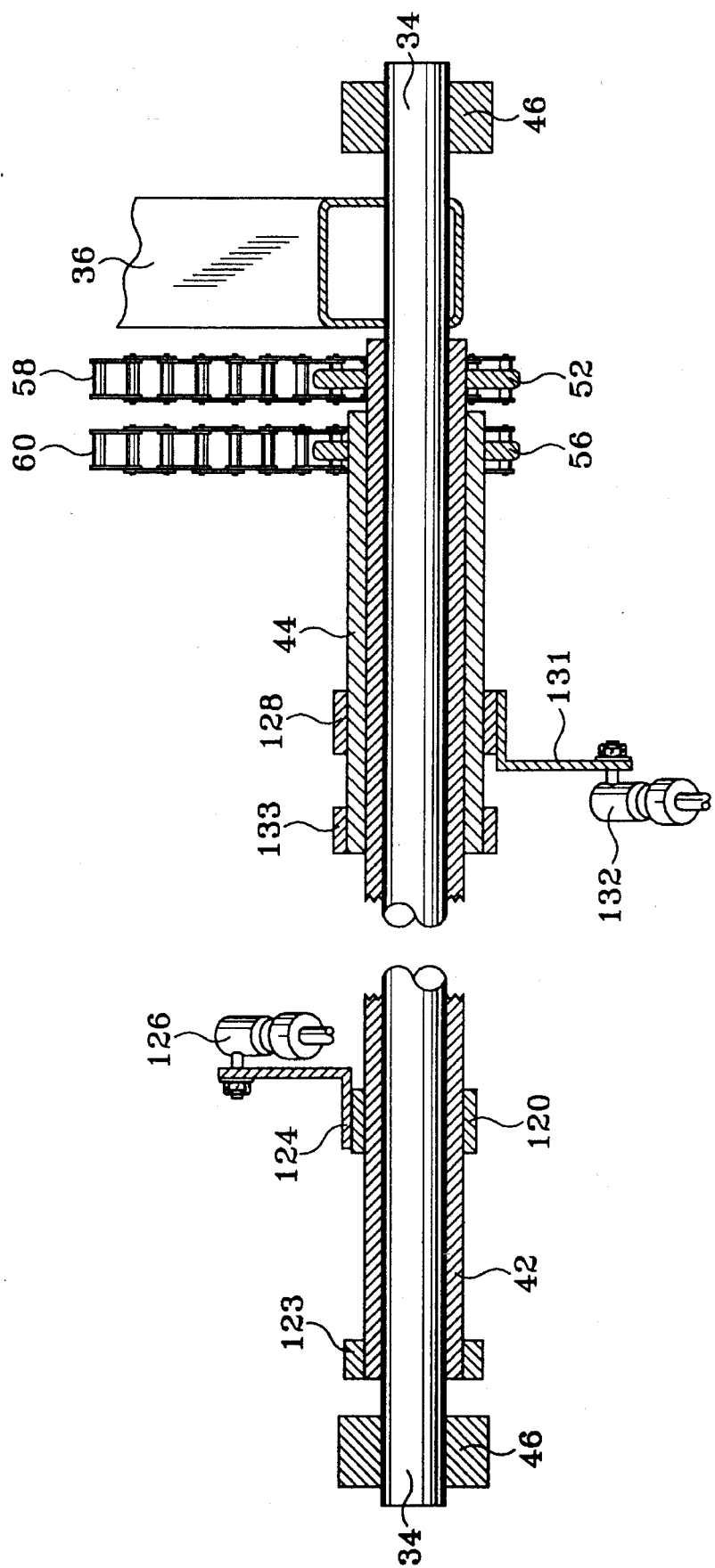
FIG. 7 is an enlarged fragmentary section view of the lower control portion of the present invention, taken along line 7—7 of FIG. 5.

Referring also to FIG. 6, engine 12 is also coupled to a pair of variable speed reversible transmissions 24, such as hydrostatic transmissions, and each transmission 24 is connected to a transaxle 26 which is in turn connected to one of rear wheels 18. A variety of hydrostatic transmissions and transaxles appropriate for use with the lawn mower of the present invention are commercially available, for instance, those hydrostatic transmissions and transaxles produced by Hydro-Gear of Sullivan, Ill.

As depicted in FIGS. 7–10, control member 30 is formed of upper shaft 32 and lower shaft 34 attached, for instance by welding, to hollow central connecting portion 36 so that upper shaft 32 and lower shaft 34 are disposed in parallel spaced-apart relation at opposing ends of connecting portion 36. First upper tube 38 is rotatably and collinearly disposed surrounding upper shaft 32, and second upper tube 40 is rotatably and collinearly disposed surrounding first upper tube 38. In this way, first and second upper tubes 38 and 40 are disposed concentrically with respect to upper shaft 32 so that each of first and second upper tubes 38 and 40 may independently rotate with respect to upper shaft 32. Similarly, first lower tube 42 is rotatably and collinearly disposed surrounding lower shaft 34, and second lower tube 44 is rotatably and collinearly disposed surrounding first lower tube 42.

Referring to FIGS. 7 and 12–19, lower shaft 34 is rotatably attached to chassis 14 at lower shaft bearings 46. Rotation of lower shaft 34 is independent of rotation of first and second lower tubes 42 and 44. By attachment of lower shaft 34 in this manner, upper and lower shafts 32 and 34 are disposed to be generally horizontal, and connecting portion 36 is disposed to be generally vertical. Control member 30 may be rotated with respect to chassis 14 with movement of connecting portion 36 confined to a vertical plane. As will be described, control member 30 may be rotated between a first position as depicted in FIGS. 1 and 3 where upper shaft 32 is disposed proximate to seat 20 for operation of lawn mower 10 in the riding mode, and a second position as depicted in FIGS. 2 and 4 where upper shaft 32 is disposed generally behind lawn mower 10 for operation in the walking mode.

Figure 8:
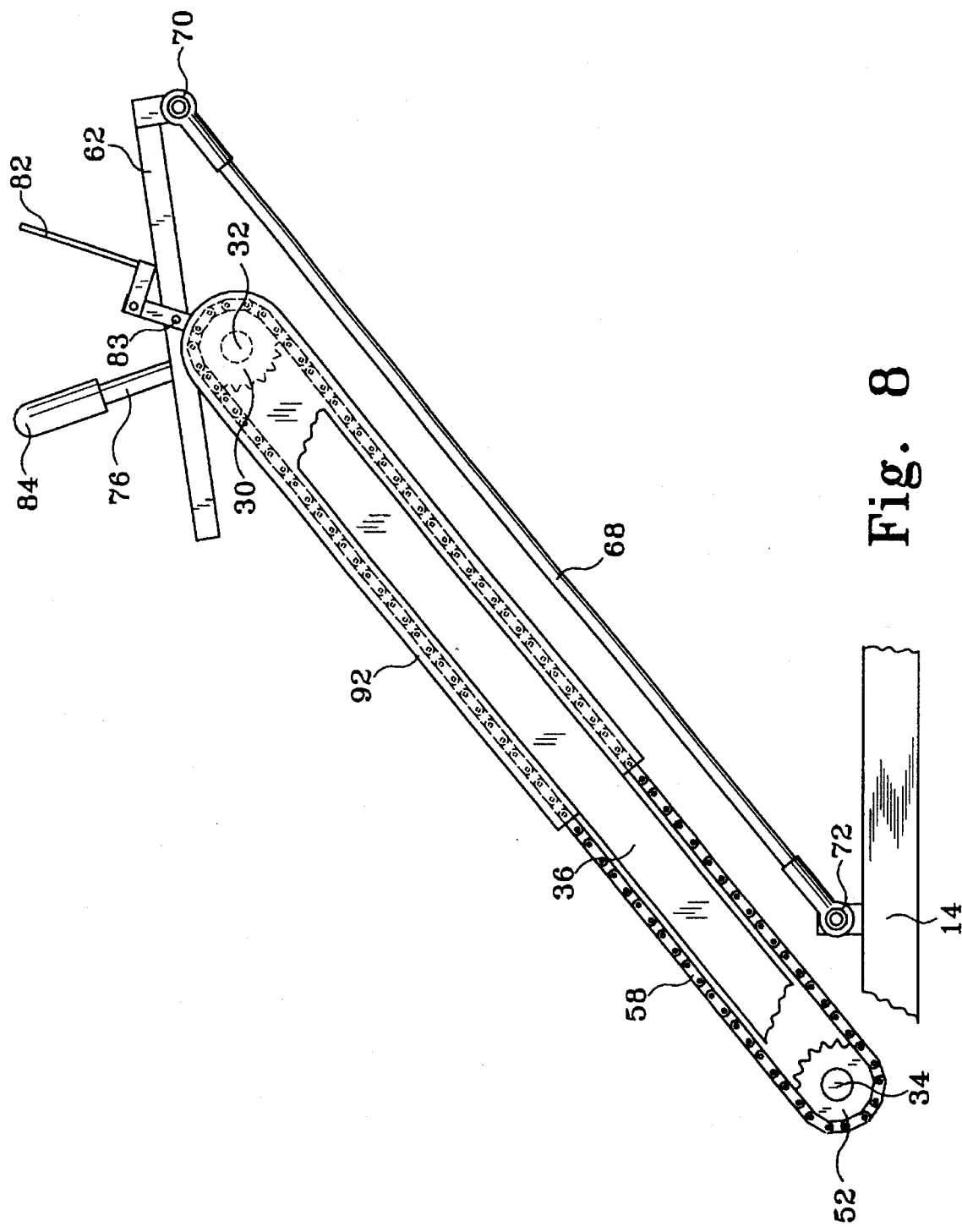
FIG. 8 is an enlarged fragmentary side view of the controls of the present invention in a mode where the operator rides upon the lawn mower.
Figure 9:
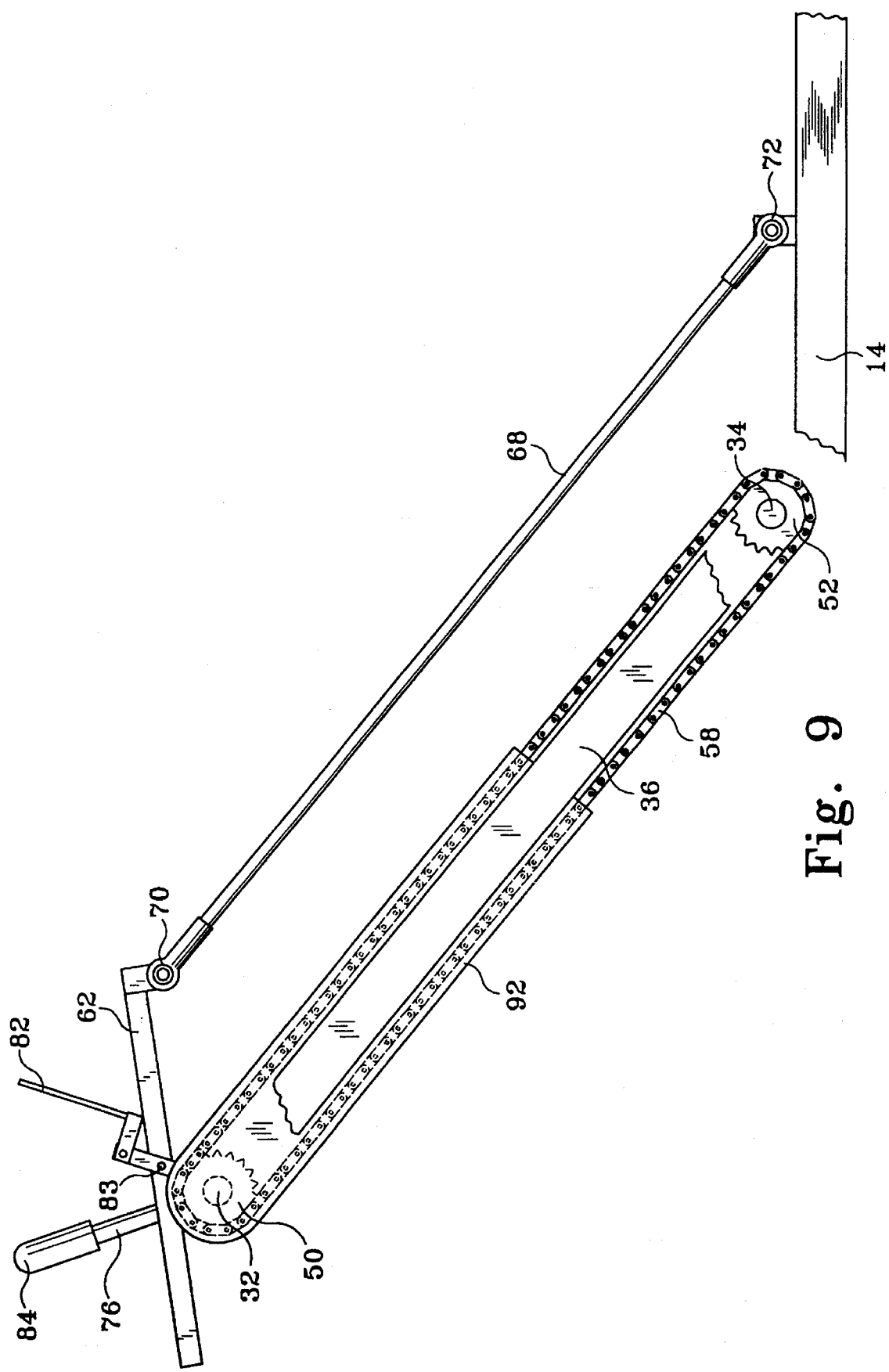
FIG. 9 is an enlarged fragmentary side view of the controls of the present invention in a mode where the operator walks along with the lawn mower.
Figure 10:
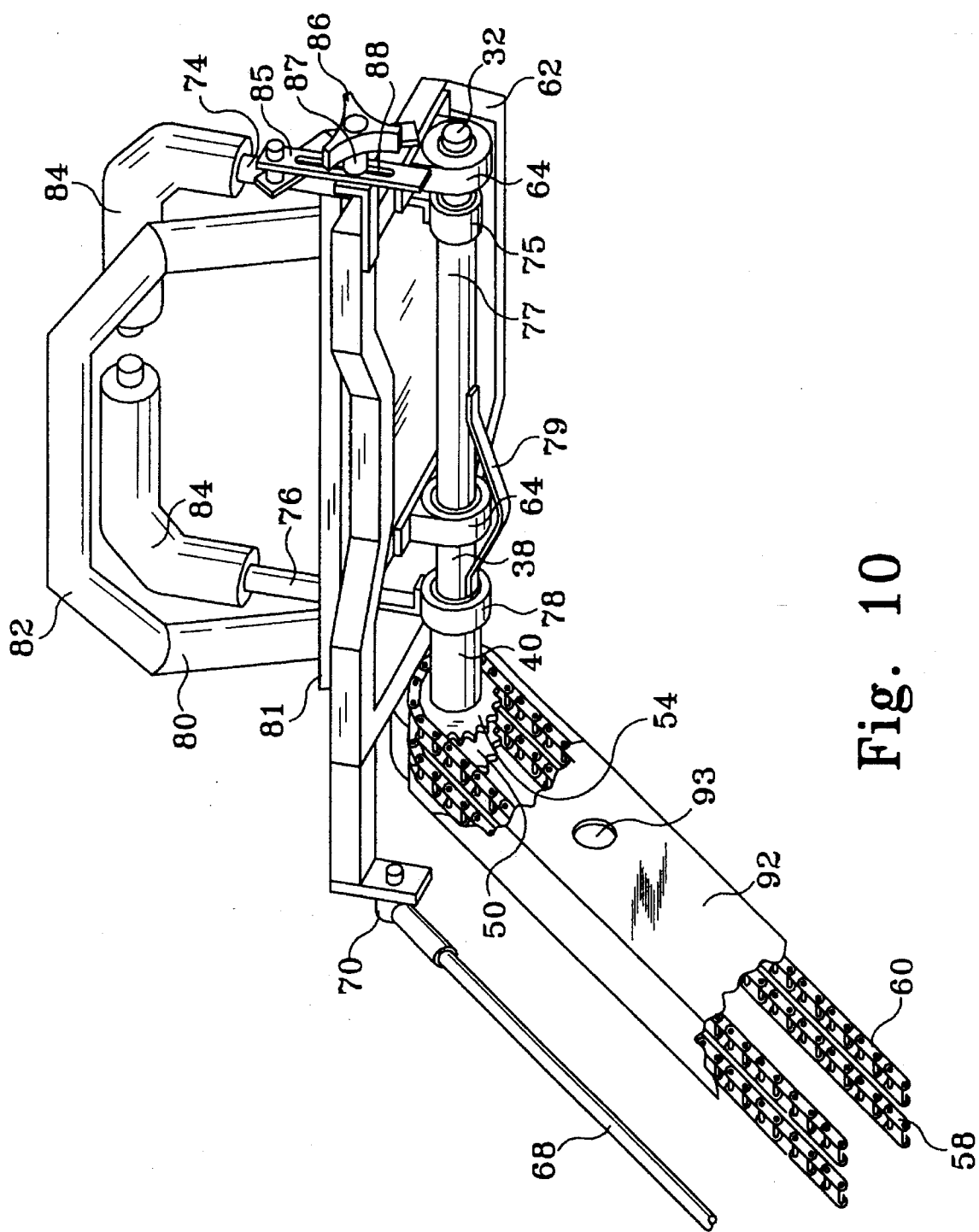
FIG. 10 is an enlarged fragmentary perspective view of the control head portion of the present invention.

Next referring to FIGS. 8–10, first upper sprocket 50 is attached to first upper tube 38 and substantially equal radius first lower sprocket 52 is attached to first lower tube 42. Similarly, second upper sprocket 54 is attached to second upper tube 40 and substantially equal radius second lower sprocket 56 is attached to second lower tube 42. First chain 58 is disposed around and rotatably connects first upper sprocket 50 and first lower sprocket 52, and second chain 60 is disposed around and rotatably connects second upper sprocket 54 and second lower sprocket 56. In this way, angular rotation of first upper tube 38 produces a substantially equal angular rotation of first lower tube 42, and angular rotation of second upper tube 40 causes a substantially equal angular rotation of second lower tube 44.

Also as shown in FIGS. 8–10, generally planar control head 62 having slots 63 is rotatably attached to upper shaft 32 by upper shaft bearings 64, so that rotation of control head 62 is independent of rotation of first and second upper tubes 38 and 40. Tie rod 68 is pivotally attached to control head 62 at upper tie rod end 70, and to chassis 14 at lower tie rod end 72, so that tie rod 68 is disposed generally parallel to connecting portion 36. By attachment of tie rod 68 in this manner, the plane of control head 62 does not rotate upon rotation of control member 30 with respect to chassis 14. Tubular first control lever 74 is attached to tube extension 77 by first upper clamp 75 and disposed to project through one of slots 63. Tube extension 77 is rotatably disposed around upper shaft 32 and is coupled to first upper tube 38 for co-rotative movement by coupling strap 79. Tubular second control lever 76 is attached to second upper tube 40 by second upper clamp 78 and disposed to project through the other slot 63. Handle 80 having handle lower portion 81 and arcuate cross-section handle upper portion 82 is pivotally attached to control head 62 at handle bolts 83 so that control levers pads 84, disposed around first and second control levers 74 and 76, are capable of pressing engagement with handle upper portion 82. Handle arm 85 is pivotally attached to handle lower portion 81, with adjustable attachment of handle arm 85 to control head 62 effectuated by action of knob 86 threadably attached to bolt 87 disposed through arm slot 88. In this way, contact of first and second control levers 74 and 76 at control lever pads 84 with handle upper portion 81 acts to limit movement of first and second control levers 74 and 76, as will be further described. Generally rectangular cross-section chain guard 92 is attached to connecting portion 36 so that first and second chains 58 and 60 are disposed therethrough.

Referring to FIGS. 5 and 8–10, engine ignition switch 90 is attached to control head 62, with an electrical harness, not shown, for electrically connecting switch 90 and engine 12, disposed through chain guard hole 93 and an upper connecting portion hole, not shown, and longitudinally within connecting portion 36. Proximate to lower shaft 34, the electrical harness emerges from connecting portion 36 through a lower connecting portion hole, not shown, for connection to the electrical system of lawn mower 10. In addition, engine throttle control 94 is attached to connecting portion 36, with throttle control cable, not shown, disposed longitudinally within connecting portion 36 and emerging from the lower connecting portion hole for connection to engine 12. Vertically disposed tubular front and rear standard bases 100 and 102, each having a standard base hole 103, are attached to chassis 14 proximate to and straddling connecting portion 36. Front and rear standards 104 and 106, each having a plurality of standard holes 108 and a support bar 109 are slidably disposed within front and rear standard bases 100 and 102, respectively. The relative height of front standard 104 within front standard base 100 and of rear standard 106 within rear standard base 102 may be adjusted by placement of a standard pin 110 through a standard base hole 103 and a selected standard hole 108. Angularly attached to the top of each of front and rear standards 104 and 106 are a pair of standard arms 114, having collinear standard arm holes 116. When control member 30 is rotated forward so as to be disposed proximate to seat 20 for use of lawn mower 10 in the riding mode, arm pin 118 is disposed through standard arm holes 116 of front standard 104, thereby securely locking control member 30 in place. Similarly, when control member 30 is rotated backward so as to be disposed generally behind lawn mower 10 for use in the walking mode, arm pin 118 is disposed through standard arm holes 116 of rear standard 106.

As shown in FIGS. 12–19, first lower clamp 120 is adjustably attached surrounding first lower tube 42 using first threaded fastener 122, and first lower tube fitting 123 is attached to first lower tube 42. First angle arm 124 is attached to first lower clamp 120 so as to project from the axis of first lower tube 42. Adjustable first link rod 126 is pivotally connected to first angle arm 124, and is disposed generally normal to the axis of first lower tube 42. In a similar manner, second lower clamp 128 is adjustably attached surrounding second lower tube 44 using second threaded fastener 130, and second angle arm 131, is attached to second lower clamp 128, projecting from the axis of second lower tube 44 generally opposing first angle arm 124. Adjustable second link rod 132 is pivotally connected to second angle arm 131, and is disposed generally normal to the axis of second lower tube 44. Second lower tube fitting 133 is attached to second lower tube 44. Beam 134 is attached to chassis 14 generally parallel to lower shaft 34 by beam fasteners 136. Integrally formed with and projecting normally from opposing sides of beam 134 are first and second beam legs 138 and 140. In addition, integrally formed with and projecting normally from opposing side of beam 134 are first and second fingers 142 and 144, with first beam leg 138 disposed opposite to first beam finger 142. First and second transmission shaft upper bearings 146 and 148 are disposed at opposing ends of beam 134, with the axis of first transmission shaft upper bearing 146 and a first transmission shaft lower bearing, not shown, aligned with a first transmission shaft bore, not shown, disposed normally through beam 134 and in mating alignment with first transmission shaft 150, and with axis of second transmission shaft upper bearing 148 and a second transmission shaft lower bearing, not shown, aligned with a second transmission shaft bore, not shown, disposed normally through beam 134 and in mating alignment with second transmission shaft 152. First and second transmission shafts 150 and 152 each serve to control one of transmissions 24. First upper slotted arm 154 and first lower slotted arm, not shown, are attached to first transmission shaft 150 so as to be parallel and disposed above and below beam 134. Similarly, second upper slotted arm 156 and second lower slotted arm, not shown, are attached to second transmission shaft 152 so as to be parallel and disposed above and below beam 134.

Also referring to FIGS. 12–19, first upper slotted arm 154 is pivotally connected to first link rod 126, so that rotation of first lower tube 42 produces translation of first link rod 126, rotation of first upper slotted arm 154 and the first lower shaft slotted arm, and rotation of first transmission shaft 150, thereby controlling one of transmissions 24. In order to positively urge first transmission shaft 150 to a neutral position, first roller 158 is provided at first upper slotted arm distal end 159 for rotative contact with angled first detent arm 160 pivotally attached to first beam leg 138 by first detent arm pin 162. First upper spring 164 is attached between first beam finger 142 and first detent arm 160 so as to bias first roller 158 to be disposed at the vertex of first detent arm 160. Direct biasing of first detent arm 160 to the neutral position is provided by a pair of first lower springs 166, each attached between the first lower slotted arm and transverse member 168 attached to beam 134.

Figure 11:
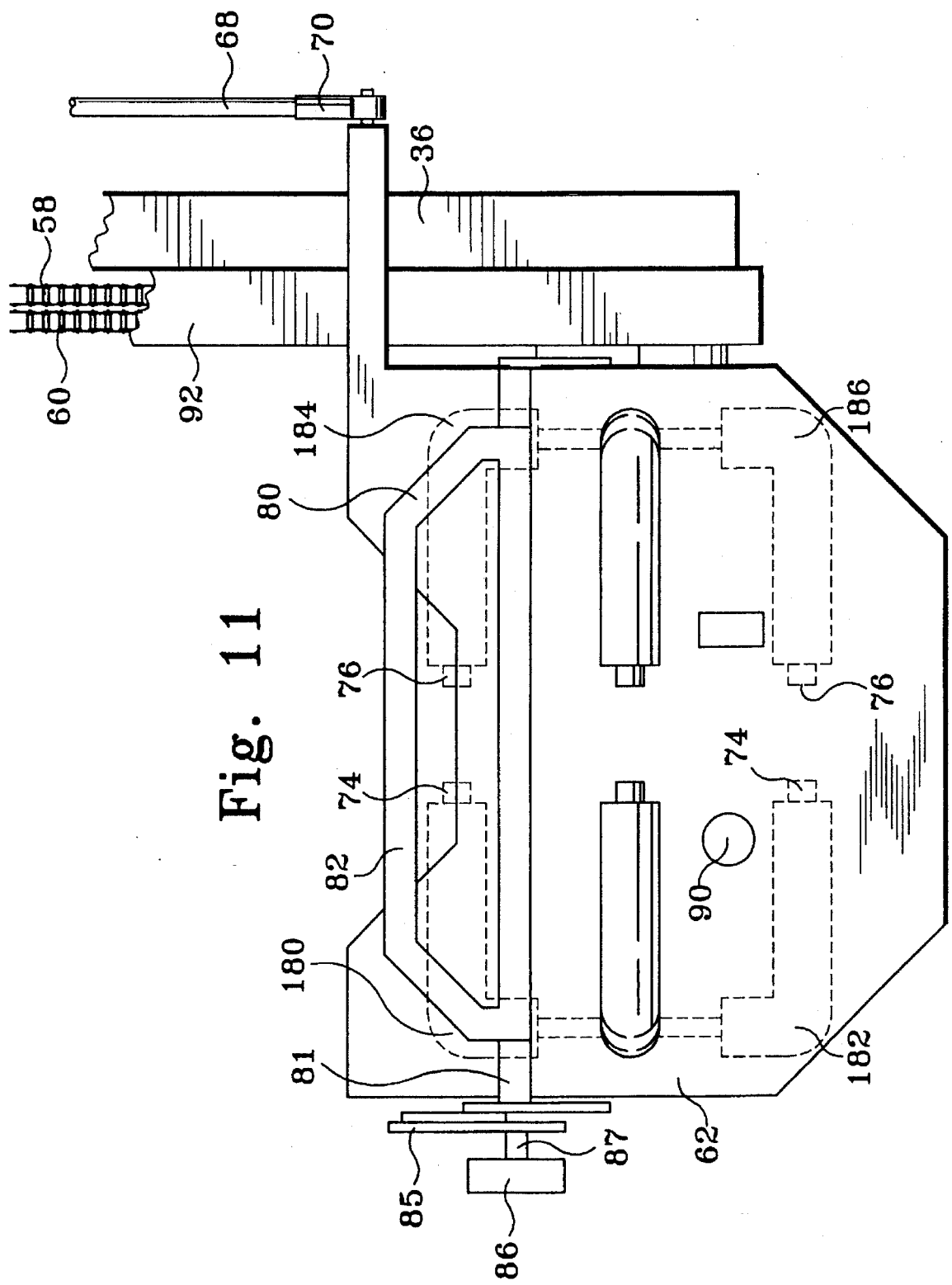
FIG. 11 is an enlarged fragmentary top plan view of the control head portion of the present invention.
Figure 12:
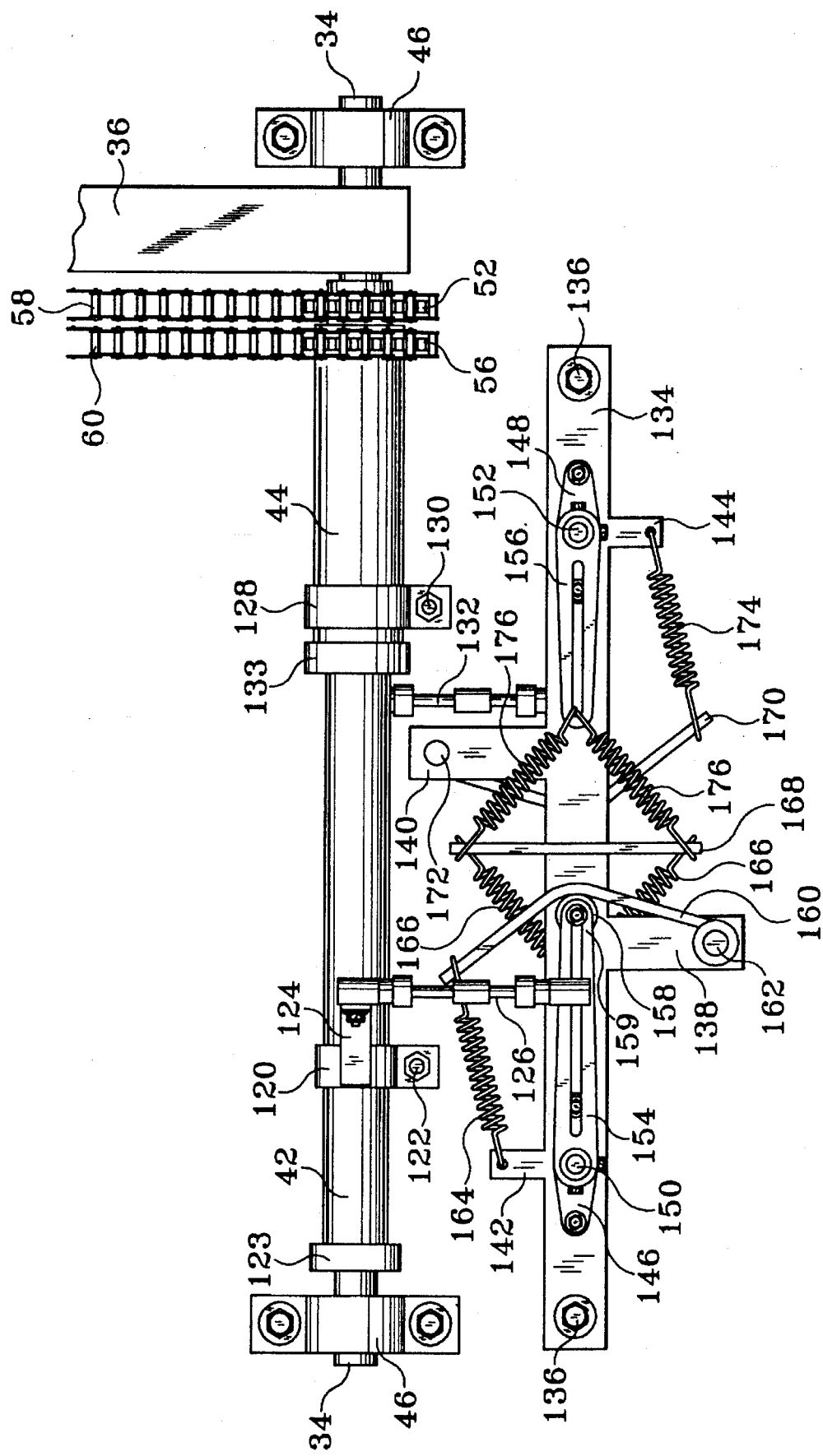
FIG. 12 is an enlarged fragmentary view of the lower control portion of the present invention with both transmission shafts disposed in a neutral position.
Figure 13:
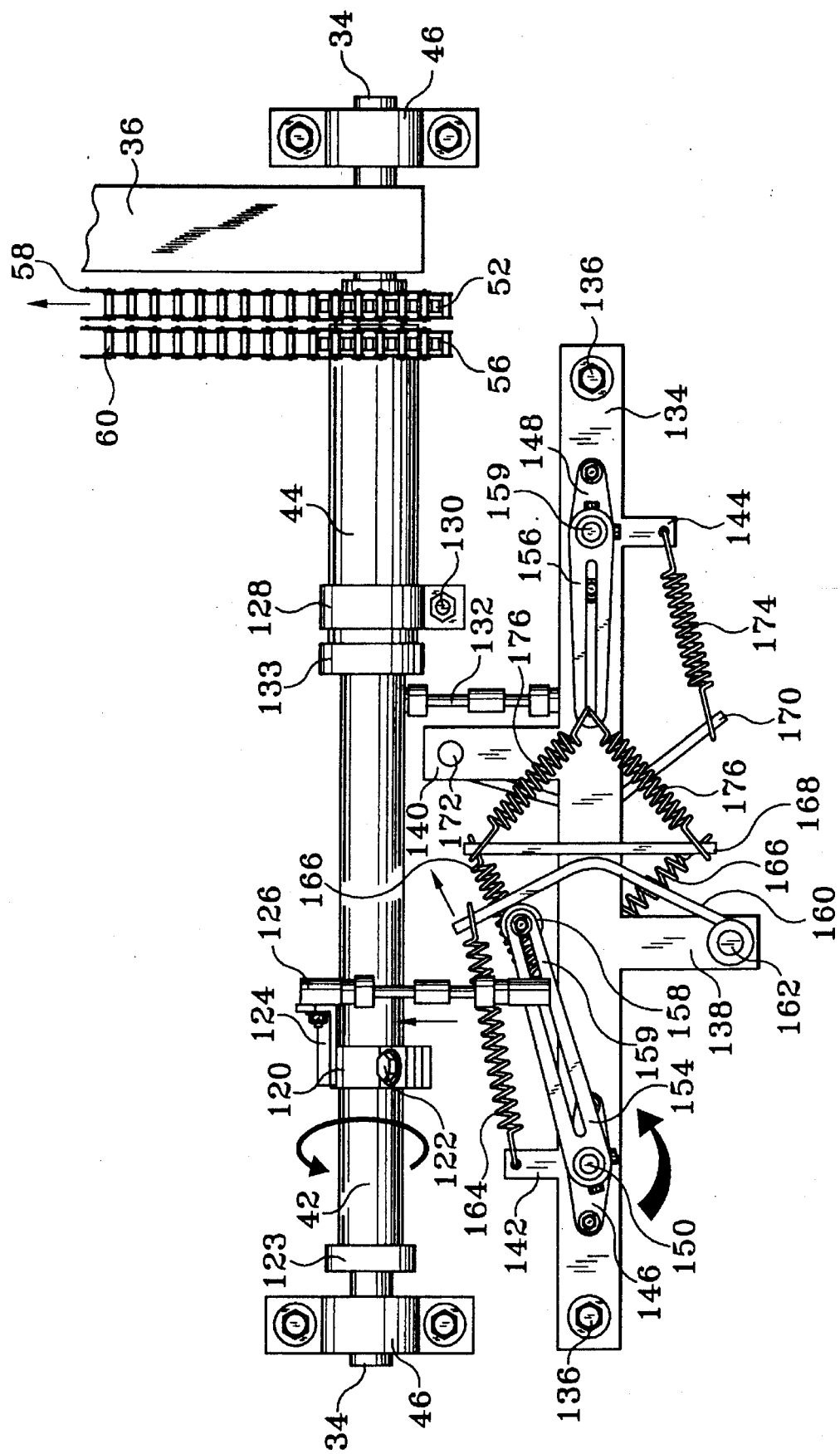
FIG. 13 is an enlarged fragmentary view of the lower control portion of the present invention with the left control lever disposed in a forward position and the right control lever disposed in a neutral position.

As depicted in FIG. 13, as first control lever 74 is moved forward towards handle 80, corresponding to the location of first control lever 74 as indicated by the reference numeral 180 in FIG. 11, first upper tube 38 and first upper sprocket 50 rotate, causing first chain 58 to move, rotating first lower sprocket 52, first lower tube 42, and first angle arm 124. As a result, first link rod 126 translates, causing rotation of first upper slotted arm 154 and the first lower slotted arm, rotating first transmission shaft 150 so that forward drive is delivered to a rear wheel 18. As first upper slotted arm 154 rotates, first roller 158 rolls from the vertex of first detent arm 160, away from first detent arm pin 162. For the reason that the distance between first transmission shaft 150 and first roller 158 is constant, during rotation of first upper slotted arm 154, first detent arm 160 is caused to pivot about first detent arm pin 162.

Figure 14:
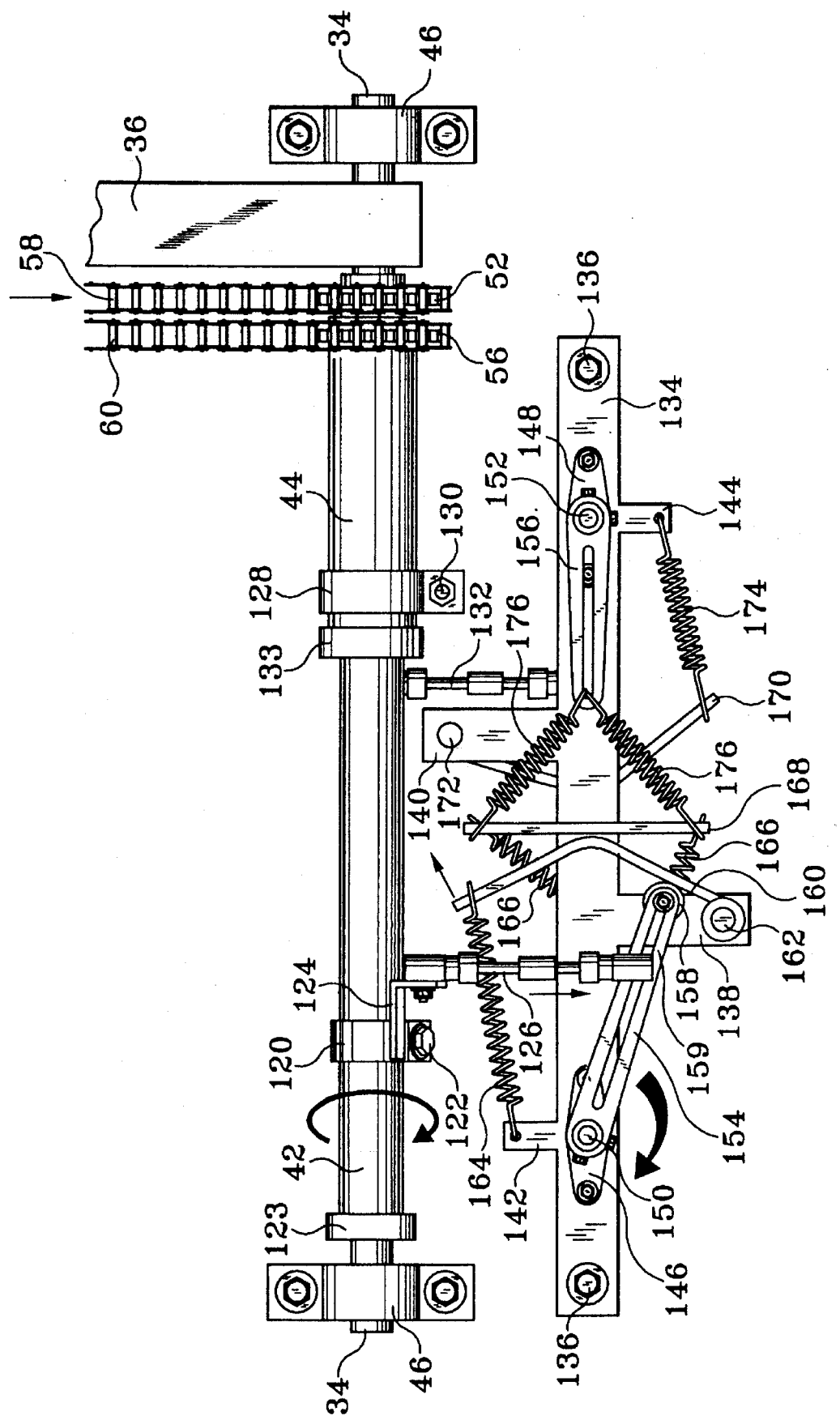
FIG. 14 is an enlarged fragmentary view of the lower control portion of the present invention with the left control lever disposed in a reverse position and the right control lever disposed in a neutral position.

Further, as depicted in FIG. 14, as first control lever 74 is moved backwards, away from handle 80, corresponding to the location of first control lever 74 as indicated by the reference numeral 182 in FIG. 11, first upper tube 38 and first upper sprocket 50 oppositely rotate, causing first chain 58 to move in the opposite direction, oppositely rotating first lower sprocket 52, first lower tube 42, and first angle arm 124. As a result, first link rod 126 translates oppositely as before, causing opposite rotation of first upper slotted arm 154 and the first lower slotted arm, rotating first transmission shaft 150 so that reverse drive is delivered to a rear wheel 18. As first upper slotted arm 154 rotates, first roller 158 rolls from the vertex of first detent arm 160 towards first detent arm pin 162.

Similarly, as shown in FIGS. 12–19, second upper slotted arm 156 is pivotally connected to second link rod 132, so that rotation of second lower tube 44 produces translation of second link rod 132, rotation of second upper slotted arm 156 and the second lower slotted arm, and rotation of second transmission shaft 152, thereby controlling the other transmission 24. To positively urge second transmission shaft 152 to a neutral position, a second roller 169 is provided at the distal end of the second lower slotted arm for rotative contact with angled second detent arm 170 pivotally attached to second beam leg 140 by second detent arm pin 172. Second lower spring 174 is attached between second beam finger 144 and second detent arm 170 so as to bias second roller 169 to be disposed at the vertex of second detent arm 170. Direct biasing for second detent arm 170 is provided by a pair of second upper springs 176, each attached between second upper slotted arm 156 and transverse member 168.

Figure 15:
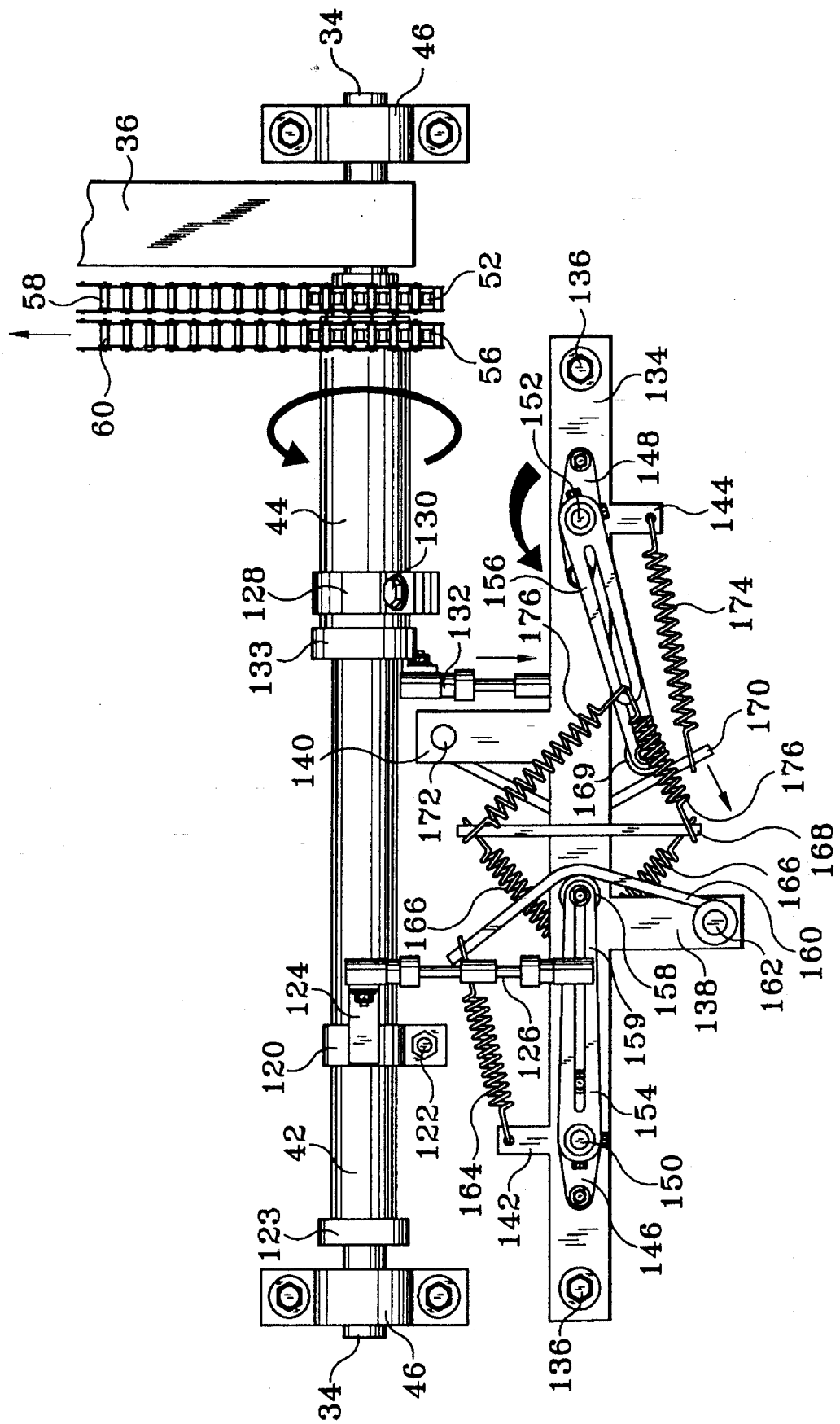
FIG. 15 is an enlarged fragmentary view of the lower control portion of the present invention with the left control lever disposed in a neutral position and the right control lever disposed in a reverse position.

As depicted in FIG. 15, as second control lever 76 is moved forward towards handle 80, corresponding to the location of second control lever 74 as indicated by the reference numeral 184 in FIG. 11, second upper tube 40 and second upper sprocket 54 rotate, causing second chain 60 to move, rotating second lower sprocket 56, second lower tube 44, and the second angle arm. As a result, second link rod 132 translates, causing rotation of second upper slotted arm 156 and the second lower slotted arm, rotating second transmission shaft 152 so that forward drive is delivered to the other rear wheel 18. As the second lower slotted arm rotates, second roller 169 rolls from the vertex of second detent arm 170 away from second detent arm pin 172. During rotation of second lower slotted arm, second detent arm 170 is caused to pivot about second detent arm pin 172.

Figure 16:
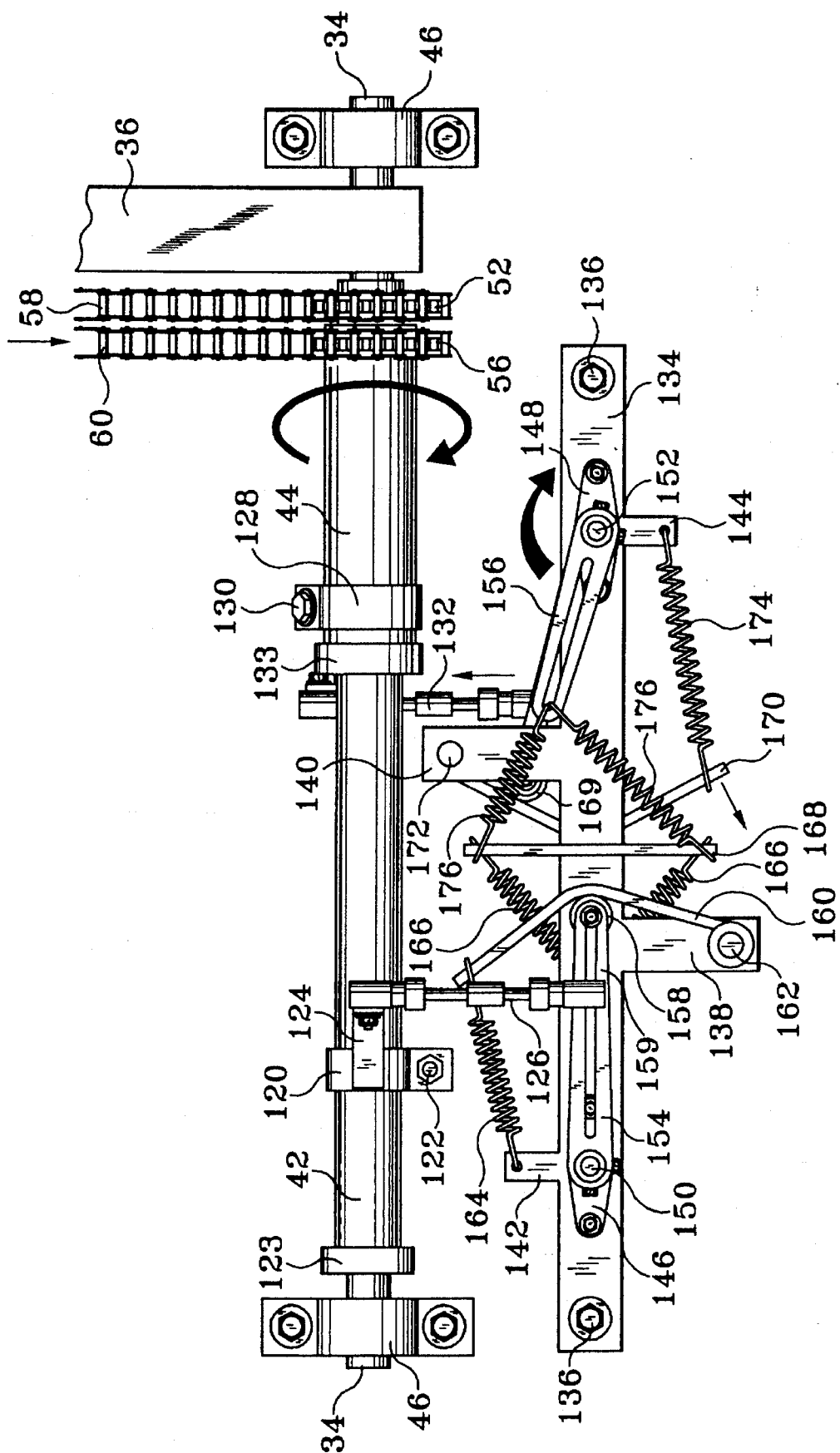
FIG. 16 is an enlarged fragmentary view of the lower control portion of the present invention with the left control lever disposed in a neutral position and the right control lever disposed in a forward position.

As illustrated in FIG. 16, as second control lever 76 is moved forward backwards, away from handle 80, corresponding to the location of second control lever 76 as indicated by the reference numeral 186 in FIG. 11, second upper tube 40 and second upper sprocket 54 oppositely rotate, causing second chain 60 to move in the opposite direction, oppositely rotating second lower sprocket 56, second lower tube 44, and the second angle arm. As a result, second link rod 132 translates opposite as before, causing opposite rotation of second upper slotted arm 156 and the second lower slotted arm, rotating second transmission shaft 152 so that reverse drive is delivered to the other rear wheel 18. As the second lower slotted arm rotates, second roller 169 rolls from the vertex of second detent arm 170 towards second detent arm pin 172.

Figure 17:
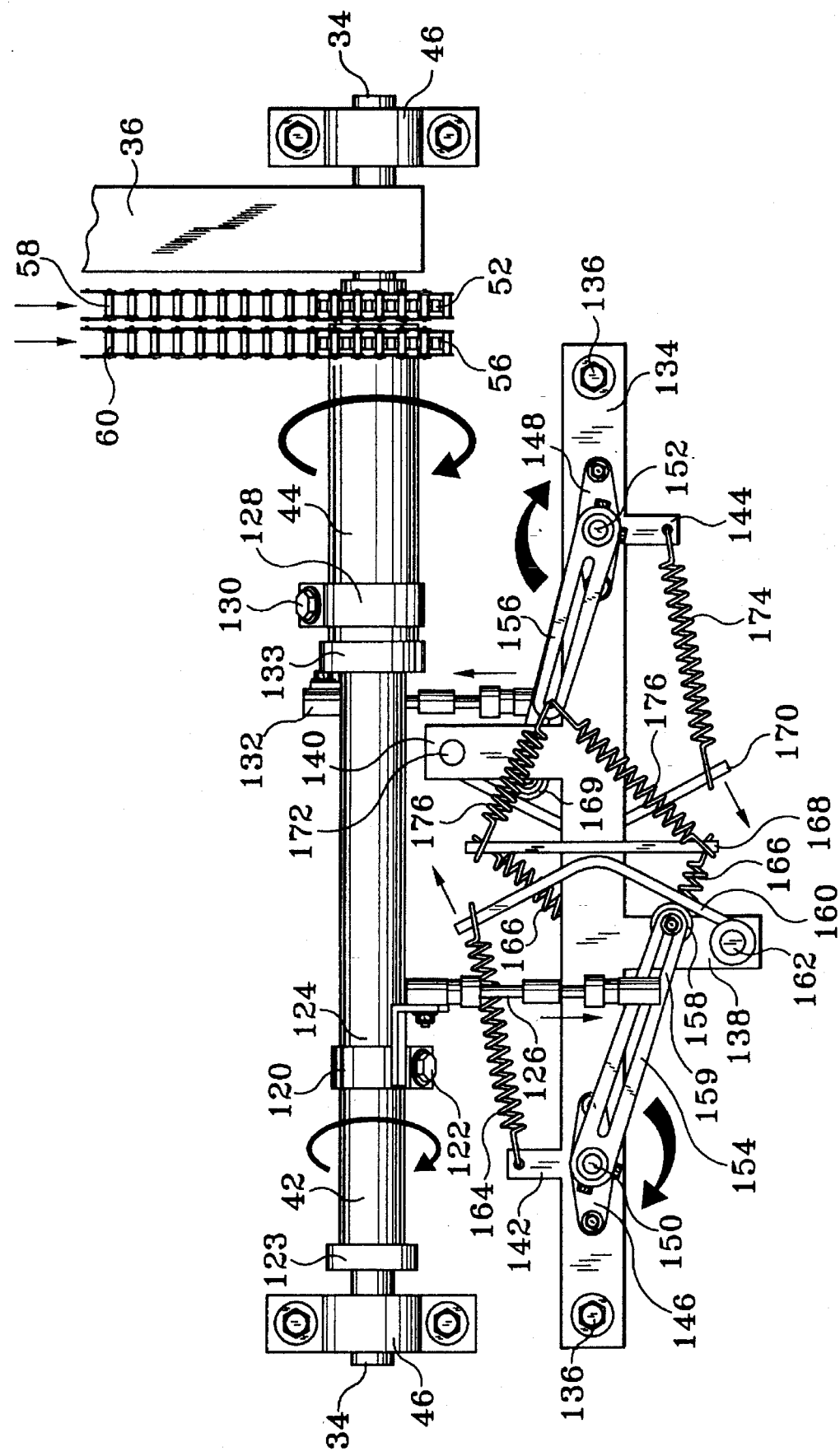
FIG. 17 is an enlarged fragmentary view of the lower control portion of the present invention with the left control lever disposed in a reverse position and the right control lever disposed in a reverse position.
Figure 18:
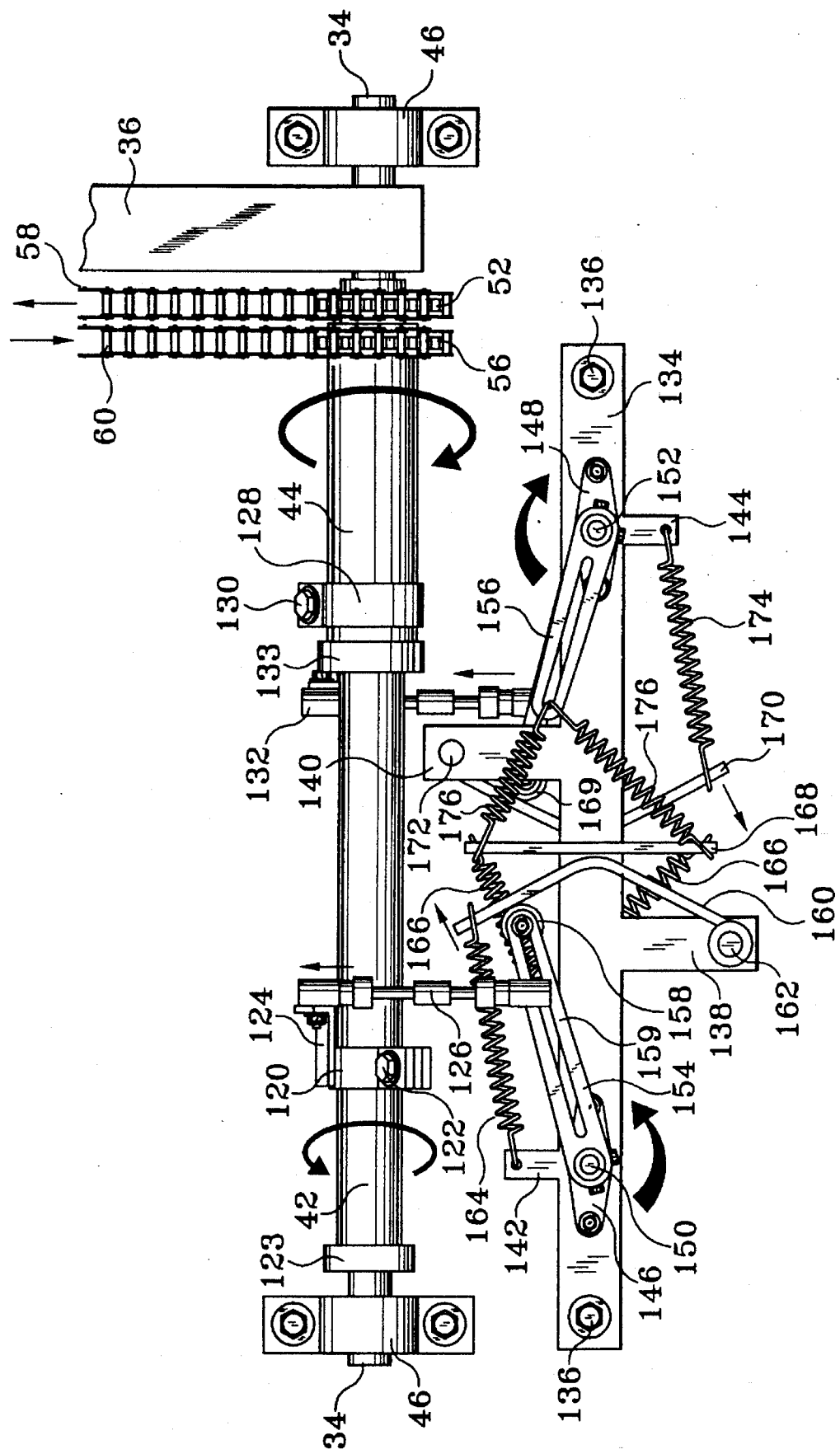
FIG. 18 is an enlarged fragmentary view of the lower control portion of the present invention with the left control lever disposed in a forward position and the right control lever disposed in a reverse position.
Figure 19:
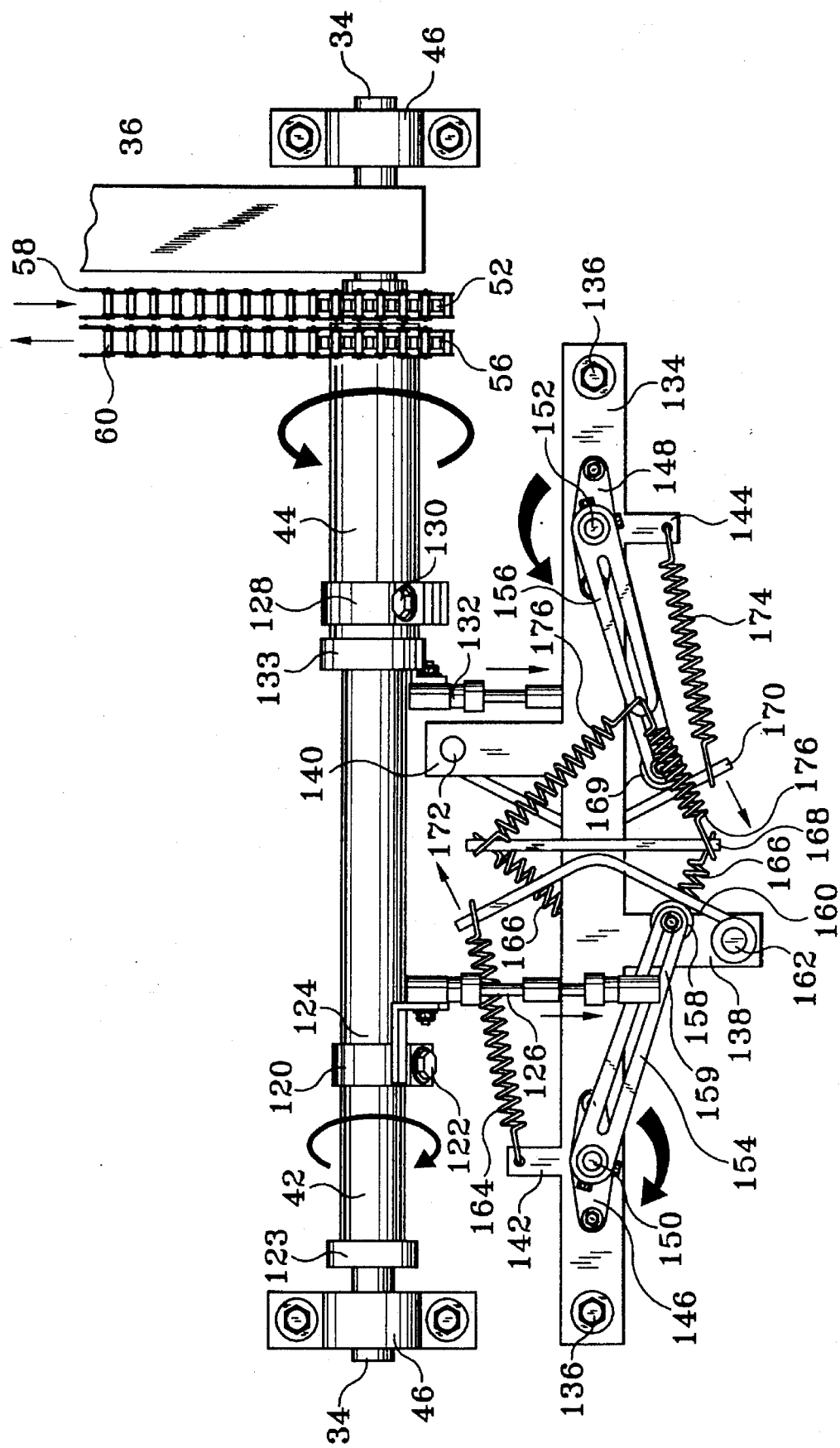
FIG. 19 is an enlarged fragmentary view of the lower control portion of the present invention with the left control lever disposed in a reverse position and the right control lever disposed in a forward position.

It will be understood that the essential arrangement of first lower springs 166 with respect to the first lower slotted arm and transverse member 168 is entirely similar to the arrangement of second upper springs 176 with respect to second upper slotted arm 156 and transverse member 168. Further, the arrangement of second detent arm 170 with respect to the second lower slotted arm is entirely similar to the arrangement of first detent arm 160 with respect to first upper slotted arm 154. In addition, it will be appreciated that first and second control levers 74 and 76 are independently operable, for instance, as shown in FIG. 17 for reverse drive of both wheels, corresponding to the location of first control lever 74 as indicated by the reference numeral 182 and second control lever 76 as indicated by the reference numeral 186 in FIG. 11, as shown in FIG. 18 for forward drive of the left rear wheel and reverse drive of the right rear wheel, corresponding to the location of first control lever 74 as indicated by the reference numeral 180 and second control lever 76 as indicated by the reference numeral 186 in FIG. 11, and as shown in FIG. 19 for reverse drive of the left rear wheel and forward drive of the right rear wheel, corresponding to the location of first control lever 74 as indicated by the reference numeral 182 and second control lever 76 as indicated by the reference numeral 184 in FIG. 11.

In use, when lawn mower 10 is to be operated in the riding mode, control member 30 is positioned with upper shaft 32 proximate to seat 20 by rotating connecting portion 36 until contact with support bar 109 of front standard 104, and thereafter inserting arm pin 118 through standard arm holes 116 of front standard 104. By positioning standard pin 110 through a selected standard hole 108, the angle of connecting portion 36, and hence the distance of upper shaft 32 and control head 62 from seat 20 in the riding mode may be adjusted for the convenience of operators of various sizes. Lawn mower 10 may then be operated in the manner of a typical zero-turn radius riding lawn mower, where forward movement of first control lever 74 causes one rear wheel 18 to rotate forward at a proportional rate, and rearward movement causes proportional rate rearward rotation. Similarly, forward movement of second control lever 76 causes the other rear wheel 18 to rotate forward at a proportional rate, and rearward movement causes proportional rate rearward rotation. To cause lawn mower 10 to move forward in a straight line at a predetermined maximum speed, first and second control levers 74 and 76 are each moved forward until contact is made with handle upper portion 82, providing equal drive to both rear wheels 18. By adjusting the relative position of handle arm 85, the maximum rotational rate of both rear wheels 18 is thereby set, and hence the forward, straight line speed of lawn mower 10 is determined. To make adjustments so that lawn mower 10 moves is a straight line when first and second control levers 74 and 76 are in contact with handle upper portion 82, first and second upper clamps 75 and 78 may be loosened, repositioned, and re-tightened, and similarly, first and second lower clamps 120 and 128 may be adjusted. Further adjustments may be made by lengthening and shortening first and second link rods 126 and 132.

To operate lawn mower 10 in the walking mode, arm pin 118 is removed from front standard 104, and control member 30 is rotated backward. During such rotation, first and second lower sprockets 52 and 56 and first and second lower tubes 42 and 44 remain stationary. First and second upper sprockets rotate with respect to upper shaft 32 during rotation of control member 30, due to movement of first and second chains 58 and 60 wrapping around first and second lower sprockets 52 and 56. For the reason that first upper sprocket 50 has substantially the same radius as first lower sprocket 52, the angle through which control member 30 is rotated is substantially equivalent to the angle by which first upper sprocket 50 rotates with respect to upper shaft 32. Similarly, as second upper sprocket 54 has substantially the same radius as first lower sprocket 56, the angle through which control member 30 is rotated is substantially equivalent to the angle by which second upper sprocket 54 rotates with respect to upper shaft 32. The result is that upon rotation of control member 30, the angle of first and second control levers 74 and 76 with respect to lawn mower 10 remains constant. In addition, as control member 30 rotates with respect to lawn mower 10, the angle of control head 62 also remains constant with respect to lawn mower 10, as tie rod 68 remains parallel to control member 30 during pivoting movement about tie rod first and second ends 70 and 72. In the walking mode, the position of first and second control levers 74 and 76 and handle 80 relative to both lawn mower 10 and control head 62 is the same as in the riding mode, as is the angle of control head 62 with respect to lawn mower 10. In a manner entirely similar to the riding mode, adjustment of the angle of connecting portion 36 may be made by positioning standard pin 110 through a selected standard hole 108 of rear standard 106, for placement of control head 62 at a height appropriate for the operator.

The present invention having been described in its preferred embodiment, it is clear that the present invention is susceptible to numerous modifications and embodiments within the ability of those skilled in the art and without the exercise of the inventive faculty. Accordingly, the scope of the present invention is defined as set forth by the scope of the following claims.

What is claimed is:

1. An improved lawn mower for use in a walking mode and a riding mode, of the type having a chassis, an engine attached to the chassis, grass cutting means attached to the chassis, seating means attached to the chassis, a pair of front wheels attached to the chassis, a plurality of rear wheels attached to the chassis, and a plurality of variable speed reversible transmissions, each of the transmissions connected to the engine and to one of the rear wheels, wherein the improvement comprises:

a control member having an upper shaft, a lower shaft, and a central connecting portion, said upper and lower shafts attached to said connecting portion in spaced-apart relation, and said lower shaft rotatably attached to the chassis;

a plurality of upper tubes rotatably and collinearly disposed surrounding said upper shaft;

a plurality of lower tubes rotatably and collinearly disposed surrounding said lower shaft;

means for connecting each of said upper tubes to one of said lower tubes so that angular rotation of each said upper tubes causes a substantially equivalent angular rotation of one of said lower tubes; and means for coupling each of said lower tubes to one of the transmissions so that rotation of each of said lower tubes controls one of the transmissions.

2. An improved lawn mower as defined in claim 1, wherein the improvement further comprises:

a control head;

means for rotatably attaching said control head to said upper shaft so that rotation of said control head is independent of rotation of said upper tubes; and means for irrotationally maintaining said control head with respect to the chassis during rotation of said lower shaft with respect to the chassis.

3. An improved lawn mower as defined in claim 2, wherein the improvement further comprises a plurality of control levers disposed proximate to said control head, each control lever attached to one of said upper tubes.

4. An improved lawn mower as defined in claim 2, wherein said control member is rotatable between a first position where said upper shaft is disposed proximate to said seat and a second position where said upper shaft is disposed generally behind said lawn mower.

5. An improved lawn mower for use in a walking mode and a riding mode, of the type having a chassis, an engine attached to the chassis, grass cutting means attached to the chassis, seating means attached to the chassis, a pair of front wheels attached to the chassis, a plurality of rear wheels attached to the chassis, and a plurality of variable speed reversible transmissions, each of the transmissions connected to the engine and to one of the rear wheels, wherein the improvement comprises:

a control member having an upper shaft, a lower shaft, and a central connecting portion, said upper and lower shafts attached to said connecting portion in spaced-apart relation;

a plurality of concentric upper tubes rotatably and collinearly disposed surrounding said upper shaft;

a plurality of concentric lower tubes rotatably and collinearly disposed surrounding said lower shaft;

means for rotatably attaching said lower shaft to the chassis;

so that rotation of said lower shaft is independent of rotation of said lower tubes;

means for connecting each of said upper tubes to one of said lower tubes so that angular rotation of each said upper tubes causes a substantially equivalent angular rotation of one of said lower tubes; and means for coupling each of said lower tubes to one of the transmissions so that rotation of each of said lower tubes controls one of the transmissions.

6. An improved lawn mower as defined in claim 5, wherein the improvement further comprises:
   a control head;
   means for rotatably attaching said control head to said upper shaft so that rotation of said control head is independent of rotation of said upper tubes; and
   means for irrotationally maintaining said control head with respect to the chassis during rotation of said lower shaft with respect to the chassis.

7. An improved lawn mower as defined in claim 6, wherein the improvement further comprises a plurality of control levers disposed proximate to said control head, each control lever attached to one of said upper tubes.

8. An improved lawn mower as defined in claim 6, wherein the improvement further comprises handle means adjustably attached to said control head.

9. An improved lawn mower as defined in claim 8, wherein said handle means includes adjustable limit means for limiting movement of each of said control levers.

10. An improved lawn mower as defined in claim 5, wherein said control member is rotatable between a first position where said upper shaft is disposed proximate to said seat and a second position where said upper shaft is disposed generally behind said lawn mower.

11. An improved lawn mower as defined in claim 10, wherein the improvement further comprises detachable lock means for fixing said control member in said first position and in said second position.

12. An improved lawn mower as defined in claim 5, wherein said connecting means comprises:
   a plurality of pairs of drive wheels, the members of each pair of drive wheels having substantially equal radii, a first member of each pair of drive wheels attached to one of said upper tubes and a second member of each pair of drive wheels attached to one of said lower tubes; and
   a plurality of loops, each loop disposed around and rotatably connecting a pair of drive wheels.

13. An improved lawn mower as defined in claim 12, wherein said drive wheels are sprockets and said loops are chains.

14. An improved lawn mower as defined in claim 5, wherein said coupling means includes neutral detent means for maintaining said coupling means in a configuration so that each of said transmissions is biased towards a neutral position.

15. An improved lawn mower as defined in claim 14, wherein said coupling means comprises:
   a plurality of first arms, each first arm pivotally attached to one of said lower shafts; and
   a plurality of second arms, each second arm connected to and controlling one of said transmissions and pivotally attached to one of said first arms.

16. An improved lawn mower as defined in claim 15, wherein said neutral detent means comprises:
   a plurality of angled members, each angled member having an interior surface and pivotally attached to said chassis so that each of said second arms bears against at least one of said interior surface surfaces; and
   means for biasing each of said second arms towards the vertex of one of said interior surfaces.

17. An improved lawn mower for use in a walking mode and a riding mode, of the type having a chassis, an engine attached to the chassis, grass cutting means attached to the chassis, seating means attached to the chassis, a pair of front wheels attached to the chassis, a plurality of rear wheels attached to the chassis, and a plurality of variable speed reversible transmissions, each of the transmissions connected to the engine and to one of the rear wheels, wherein the improvement comprises:
   a control member having an upper shaft, a lower shaft, and a central connecting portion, said upper and lower shafts attached to said connecting portion in spaced-apart relation;
   a plurality of concentric upper tubes rotatably and collinearly attached to said upper shaft;
   a plurality of concentric lower tubes rotatably and collinearly attached to said lower shaft;
   means for rotatably attaching said lower shaft to the chassis so that rotation of said lower shaft is independent of rotation of said lower tubes;
   means for connecting each of said upper tubes to one of said lower tubes so that angular rotation of each said upper tubes causes a substantially equivalent angular rotation of one of said lower tubes;
   means for coupling each of said lower tubes to one of the transmissions so that rotation of each of said lower tubes with respect to said lower shaft controls one of the transmissions;
   a generally planar control head;
   means for rotatably attaching said control head to said upper shaft so that rotation of said control head is independent of rotation of said upper tubes;
   means for coupled rotation of said control head so that the plane defined by said control head does not rotate upon rotation of said lower shaft with respect to said chassis; and
   a plurality of control levers disposed proximate to said control head, each control lever attached to one of said upper tubes.

18. An improved lawn mower as defined in claim 17, wherein the improvement further comprises handle means adjustably attached to said control head.

19. An improved lawn mower as defined in claim 17, wherein the handle means includes adjustable limit means for limiting movement of each of said control levers.

20. An improved lawn mower as defined in claim 17, wherein said control member is rotatable between a first position where said upper shaft is disposed proximate to said seat and a second position where said upper shaft is disposed generally behind said lawn mower.

21. An improved lawn mower as defined in claim 20, wherein the improvement further comprises detachable lock means for fixing said control member in said first position and in said second position.

22. An improved lawn mower as defined in claim 17, wherein said connecting means comprises:
   a plurality of pairs of drive wheels, the members of each pair of drive wheels having substantially equal radii, a first member of each pair of drive wheels attached to one of said upper tubes and a second member of each pair of drive wheels attached to one of said lower tubes; and
   a plurality of loops, each loop disposed around and rotatably connecting a pair of drive wheels.

23. An improved lawn mower as defined in claim 22, wherein said drive wheels are sprockets and said loops are chains.

24. An improved lawn mower as defined in claim 17, wherein said coupling means includes neutral detent means for maintaining said coupling means in a configuration so that each of said transmissions is biased towards a neutral position.

25. An improved lawn mower as defined in claim 24, wherein said coupling means comprises:
   a plurality of first arms, each first arm pivotally attached to one of said lower shafts; and
   a plurality of second arms, each second arm connected to and controlling one of said transmissions and pivotally attached to one of said first arms.

26. An improved lawn mower as defined in claim 25, wherein said neutral detent means comprises:
   a plurality of angled members, each angled member having an interior surface and pivotally attached to said chassis so that each of said second arms bears against at least one of said interior surface surfaces; and
   means for biasing each of said second arms towards the vertex of one of said interior surfaces.

27. An improved lawn mower for use in a walking mode and a riding mode, of the type having a chassis, an engine attached to the chassis, grass cutting means attached to the chassis, seating means attached to the chassis, a pair of front wheels attached to the chassis, a pair of rear wheels attached to the chassis, a pair of variable speed reversible transmissions, each transmission connected to the engine and to one of the rear wheels, wherein the improvement comprises:
   a control member having an upper shaft, a lower shaft, and a central connecting portion, said upper and lower shafts disposed generally horizontal and in parallel spaced-apart relation at opposing ends of said connecting portion, and said connecting portion is disposed to be generally vertical;
   a first upper tube, rotatably and collinearly attached surrounding said upper shaft;
   a second upper tube, rotatably and collinearly attached to said upper shaft and disposed surrounding said first upper tube;
   a first lower tube, rotatably and collinearly attached surrounding said lower shaft;
   a second lower tube, rotatably and collinearly attached to said lower shaft and disposed surrounding said first lower tube;
   a pair of substantially equal radius first drive wheels, one of said first drive wheels attached to each of said first upper tube and said first lower tube;
   a pair of substantially equal radius second drive wheels, one of said second drive wheels attached to each of said second upper tube and said second lower tube;
   means for rotatably attaching said lower shaft to the chassis so that rotation of said lower shaft is independent of rotation of said first and second lower tubes and said control member is rotatable between a first position where said upper shaft is disposed proximate to said seat and a second position where said upper shaft is disposed generally behind said lawn mower;
   means for connecting said first upper tube to said first lower tube and said second upper tube to said second lower tube so that angular rotation of said first upper tube causes a substantially equivalent angular rotation of said first lower tube and angular rotation of said second upper tube causes a substantially equivalent angular rotation of said second lower tube;
   means for coupling each of said first and second lower tubes to one of the transmissions so that rotation of each of said first and second lower tubes with respect to said lower shaft controls one of the transmissions, including neutral detent means for biasing each of said transmissions towards a neutral position;
   a generally planar control head;
   means for rotatably attaching said control head to said upper shaft so that rotation of said control head is independent of rotation of said first and second upper tubes;
   a tie rod pivotally attached to said control head and to said chassis so that said tie rod is generally parallel to said connecting portion, for coupled rotation of said control head so that the plane defined by said control head does not rotate upon rotation of said lower shaft with respect to said chassis;
   a first control lever attached to said first upper tube and disposed proximate to said control head;
   a second control lever attached to said second upper tube and disposed proximate to said control head; and
   handle means adjustably attached to said control head, including adjustable limit means for limiting movement of each of said control levers.

28. A lawn mower as defined in claim 27, wherein said connecting means comprises:
   a pair of substantially equal radius first drive wheels, one of said first drive wheels attached to each of said first upper tube and said first lower tube;
   a pair of substantially equal radius second drive wheels, one of said second drive wheels attached to each of said second upper tube and said second lower tube; and
   a pair of loops, one of said loops disposed around and rotatably connecting said first drive wheels and disposed around and rotatably connecting said second drive wheels.

29. A lawn mower as defined in claim 28, wherein said drive wheels are sprockets and said loops are chains.

30. A lawn mower as defined in claim 28, wherein the improvement further comprises detachable lock means for fixing said control member in said first position and in said second position.

31. An improved lawn mower as defined in claim 30, wherein said coupling means includes neutral detent means for maintaining said coupling means in a configuration so that each of said transmissions is biased towards a neutral position.

32. An improved lawn mower as defined in claim 31, wherein said coupling means comprises:
   a plurality of first arms, each first arm pivotally attached to one of said lower shafts; and
   a plurality of second arms, each second arm connected to and controlling one of said transmissions and pivotally attached to one of said first arms.

33. An improved lawn mower as defined in claim 32, wherein said neutral detent means comprises:
   a plurality of angled members, each angled member having an interior surface and pivotally attached to said chassis so that each of said second arms bears against at least one of said interior surface surfaces; and
   means for biasing each of said second arms towards the vertex of one of said interior surfaces.

* * * * *